United States Patent [19]
Sherwood et al.

[11] Patent Number: 6,163,768
[45] Date of Patent: Dec. 19, 2000

[54] NON-INTERACTIVE ENROLLMENT IN SPEECH RECOGNITION

[75] Inventors: Stefan Sherwood, Belmont; David Wilsberg Parmenter, Newton; Joel M. Gould, Winchester; Toffee A. Albina, Cambridge; Allan Gold, Acton, all of Mass.

[73] Assignee: Dragon Systems, Inc., Newton, Miss.

[21] Appl. No.: 09/094,609

[22] Filed: Jun. 15, 1998

[51] Int. Cl.[7] ............................ G10L 15/04; G10L 15/06; G10L 15/26

[52] U.S. Cl. .......................... 704/235; 704/260; 704/251; 704/244; 704/257

[58] Field of Search ..................................... 704/254, 255, 704/256, 257, 243, 244, 235, 251, 252, 260

[56] References Cited

U.S. PATENT DOCUMENTS

| | | |
|---|---|---|
| 4,618,984 | 10/1986 | Das et al. . |
| 4,759,068 | 7/1988 | Bahl et al. . |
| 4,776,016 | 10/1988 | Hansen . |
| 4,783,803 | 11/1988 | Baker et al. . |
| 4,805,218 | 2/1989 | Bamberg et al. . |
| 4,805,219 | 2/1989 | Baker et al. . |
| 4,817,156 | 3/1989 | Bahl et al. . |

(List continued on next page.)

FOREIGN PATENT DOCUMENTS

| | | |
|---|---|---|
| 0 867 857 | 9/1998 | European Pat. Off. . |
| 2 082 820 | 3/1982 | United Kingdom . |

OTHER PUBLICATIONS

Zue, Victor, Toward Systems that Understand Spoken Language. IEEE Expart, pp. 51–59, Feb. 1994.

"Speech–Recognition System Enrollment Program with Training Features", IBM Technical Disclosure Bulletin, vol. 37, No. 10, Oct. 1994, p. 149.

"Example Enrollment Text Playback for an Automatic Speech Recognizer", IBM Technical Disclosure Bulletin, vol. 36, No. 3, Mar. 1993, p. 413.

European Search Report dated Feb. 19, 1999.

"Dragon NaturallySpeaking Professional", User guide, version 3.0, Jul. 1998, Dragon Systems, Inc. XP002116949 p. 18—p. 23.

European Search Report dated Oct. 13, 1999.

Asadi, Ayman, "Automatic Modeling for Adding New Words to a Large Vocabulary", ICASSP 91, vol. 1 (1991), pp. 305–308.

Bahl, L.R., "Adaptation of Large Vocabulary Recognition System," ICASSO–92, vol. 1, (Mar. 1992), pp. 1477–1480.

Bahl, L.R., "Automatic Selection of Speech Prototypes," IBM Technical Disclosure Bulletin, vol. 24, No. 4 (Sep. 1981), pp. 2042–2043.

Bamberg, Paul G. et al., "Adaptation Performance in a Large–Vocabulary Recognizer," Dragon Systems, Inc., Newton, MA, pp. 1–7.

Imai, Toru. "A New Method for Automatic Generation of Speaker–Dependent Phonological Rules," The 1995 International Conference on Acoustics, Speech, and Signal Processing, vol. 1 (May 1995), pp. 864–867.

*Primary Examiner*—David R. Hudspeth
*Assistant Examiner*—Abul K. Azad
*Attorney, Agent, or Firm*—Fish & Richardson PC

[57] ABSTRACT

A computer enrolls a user in a speech recognition system by obtaining data representing a user's speech, the speech including multiple user utterances and generally corresponding to an enrollment text, and analyzing acoustic content of data corresponding to a user utterance. The computer determines, based on the analysis, whether the user utterance matches a portion of the enrollment text. If so, the computer uses the acoustic content of the user utterance to update acoustic models corresponding to the portion of the enrollment text. The computer may determine that the user utterance matches a portion of the enrollment text even when the user has skipped or repeated words of the enrollment text.

31 Claims, 17 Drawing Sheets

U.S. PATENT DOCUMENTS

| | | |
|---|---|---|
| 4,817,158 | 3/1989 | Picheny . |
| 4,817,161 | 3/1989 | Kaneko . |
| 4,819,271 | 4/1989 | Bahl et al. . |
| 4,827,521 | 5/1989 | Bahl et al. . |
| 4,829,576 | 5/1989 | Porter . |
| 4,829,577 | 5/1989 | Kuroda et al. . |
| 4,829,578 | 5/1989 | Roberts . |
| 4,833,712 | 5/1989 | Bahl et al. . |
| 4,876,720 | 10/1989 | Kaneko et al. . |
| 4,882,759 | 11/1989 | Bahl et al. . |
| 4,903,305 | 2/1990 | Gillick et al. . |
| 4,914,703 | 4/1990 | Gillick . |
| 4,926,488 | 5/1990 | Nadas et al. . |
| 4,931,950 | 6/1990 | Isle et al. . |
| 4,972,485 | 11/1990 | Dautrich et al. . |
| 4,984,177 | 1/1991 | Rondel et al. . |
| 4,991,217 | 2/1991 | Garrett et al. . |
| 5,027,406 | 6/1991 | Roberts et al. . |
| 5,031,217 | 7/1991 | Nishimura . |
| 5,033,087 | 7/1991 | Bahl et al. . |
| 5,036,538 | 7/1991 | Oken et al. . |
| 5,046,099 | 9/1991 | Nishimura . |
| 5,050,215 | 9/1991 | Nishimura . |
| 5,054,074 | 10/1991 | Bakis . |
| 5,054,085 | 10/1991 | Meisel et al. . |
| 5,072,452 | 12/1991 | Brown et al. . |
| 5,127,055 | 6/1992 | Larkey . |
| 5,129,001 | 7/1992 | Bahl et al. . |
| 5,170,432 | 12/1992 | Hackbarth et al. . |
| 5,202,952 | 4/1993 | Gillick et al. . |
| 5,222,190 | 6/1993 | Pawate et al. ............... 704/200 |
| 5,231,670 | 7/1993 | Goldhor et al. . |
| 5,278,942 | 1/1994 | Bahl et al. . |
| 5,333,236 | 7/1994 | Bahl et al. . |
| 5,398,220 | 3/1995 | Barker . |
| 5,428,707 | 6/1995 | Gould et al. . |
| 5,440,663 | 8/1995 | Moese et al. . |
| 5,444,768 | 8/1995 | Lemaire et al. . |
| 5,465,317 | 11/1995 | Epstein . |
| 5,467,425 | 11/1995 | Lau et al. . |
| 5,468,947 | 11/1995 | Danielson et al. . |
| 5,491,774 | 2/1996 | Norris et al. . |
| 5,497,447 | 3/1996 | Bahl et al. . |
| 5,600,756 | 2/1997 | Ely ............... 704/235 |
| 5,710,864 | 1/1998 | Juang et al. . |
| 5,715,367 | 2/1998 | Gillick et al. . |
| 5,732,187 | 3/1998 | Scruggs et al. ............... 704/251 |
| 5,754,972 | 5/1998 | Baker et al. . |
| 5,765,132 | 6/1998 | Roberts . |
| 5,809,464 | 9/1998 | Kopp et al. ............... 704/235 |
| 5,937,380 | 8/1999 | Segan ............... 704/235 |

FIG. 9

| Frame | 840 ("A") | 805 ("B") | 810 ("C") | 815 ("D") | Next Node ("N") |
|---|---|---|---|---|---|
| 0 | 0 | --- | --- | --- | --- |
| 1 | $S_{A1}=A_{A1}$ | $S_{B1}=A_{B1}$ | --- | --- | --- |
| 2 | $S_{A2}=S_{A1}+A_{A2}$ | $S_{B2}=\min(S_{B1}+stay_B, S_{A1})+A_{B2}$ | $S_{C2}=S_{B1}+leave_B+A_{C2}$ | --- | --- |
| 3 | $S_{A3}=S_{A2}+A_{A3}$ | $S_{B3}=\min(S_{B2}+stay_B, S_{A2})+A_{B3}$ | $S_{C3}=\min(S_{C2}+stay_C, S_{B2}+leave_B)+A_{C3}$ | $S_{D3}=S_{C2}+leave_C+A_{D3}$ | --- |
| 4 | $S_{A4}=S_{A3}+A_{A4}$ | $S_{B4}=\min(S_{B3}+stay_B, S_{A3})+A_{B4}$ | $S_{C4}=\min(S_{C3}+stay_C, S_{B3}+leave_B)+A_{C4}$ | $S_{D4}=\min(S_{D3}+stay_D, S_{C3}+leave_C)+A_{D4}$ | $S_{N4}=S_{D2}+leave_D+A_{D4}$ |
| n | $S_{An}=S_{An-1}+A_{An}$ | $S_{Bn}=\min(S_{Bn-1}+stay_B, S_{An-1})+A_{Bn}$ | $S_{Cn}=\min(S_{Cn-1}+stay_C, S_{Bn-1}+leave_B)+A_{Cn}$ | $S_{Dn}=\min(S_{Dn-1}+stay_D, S_{Cn-1}+leave_C)+A_{Dn}$ | $S_{NN}=\min(S_{Nn-1}+leave_D, S_{Mn-1}+leave_M)+A_{Nm}$ |

FIG. 10

| Frame | 810 ("A") | 805 ("B") | 810 ("C") | 815 ("D") | Next Node ("N") |
|---|---|---|---|---|---|
| 0 | $S_{A0}=0$ | --- | --- | --- | --- |
| 1 | $S_{A1}=f(S_{A0}, A_{A1})$ | $S_{B1}=f(S_{A0}, A_{B1})$ | --- | --- | --- |
| 2 | $S_{A2}=f(S_{A1}, A_{A2})$ | $S_{B2}=f(S_{B1}, stay_B, S_{A1}, A_{B2})$ | $S_{C2}=f(S_{B1}, leave_B, A_{C2})$ | --- | --- |
| 3 | $S_{A3}=f(S_{A2}, A_{A3})$ | $S_{B3}=f(S_{B2}, stay_B, S_{A2}, A_{B3})$ | $S_{C3}=f(S_{C2}, stay_C, S_{B2}, leave_B, A_{C3})$ | $S_{D3}=f(S_{C2}, leave_C, A_{D3})$ | --- |
| 4 | $S_{A4}=f(S_{A3}, A_{A4})$ | $S_{B4}=f(S_{B3}, stay_B, S_{A3}, A_{B4})$ | $S_{C4}=f(S_{C3}, stay_C, S_{B3}, leave_B, A_{C4})$ | $S_{D4}=f(S_{D3}, stay_D, S_{C3}, leave_C, A_{D4})$ | $S_{N4}=f(S_{D3}, leave_D, A_{D3})$ |
| n | $S_{An}=f(S_{An-1}, A_{An})$ | $S_{Bn}=f(S_{Bn-1}, stay_B, S_{An-1}, A_{Bn})$ | $S_{Cn}=f(S_{Cn-1}, stay_C, S_{Bn-1}, leave_B, A_{Cn})$ | $S_{Dn}=f(S_{Dn-1}, stay_D, S_{Cn-1}, leave_C, A_{Dn})$ | $S_{Nn}=f(S_{Dn-1}, leave_N, A_{Nn})$ |

NON-INTERACTIVE ENROLLMENT IN SPEECH RECOGNITION

TECHNICAL FIELD

The invention relates to enrollment in speech recognition.

BACKGROUND

A speech recognition system analyzes a user's speech to determine what the user said. Most speech recognition systems are frame-based. In a frame-based system, a processor divides a signal descriptive of the speech to be recognized into a series of digital frames, each of which corresponds to a small time increment of the speech.

A continuous speech recognition system can recognize spoken words or phrases regardless of whether the user pauses between them. By contrast, a discrete speech recognition system recognizes discrete words or phrases and requires the user to pause briefly after each discrete word or phrase. Continuous speech recognition systems typically have a higher incidence of recognition errors in comparison to discrete recognition systems due to complexities of recognizing continuous speech. A more detailed description of continuous speech recognition is provided in U.S. Pat. No. 5,202,952, entitled "LARGE-VOCABULARY CONTINUOUS SPEECH PREFILTERING AND PROCESSING SYSTEM," which is incorporated by reference.

In general, the processor of a continuous speech recognition system analyzes "utterances" of speech. An utterance includes a variable number of frames and may correspond to a period of speech followed by a pause of at least a predetermined duration.

The processor determines what the user said by finding acoustic models that best match the digital frames of an utterance, and identifying text that corresponds to those acoustic models. An acoustic model may correspond to a word, phrase or command from a vocabulary. An acoustic model also may represent a sound, or phoneme, that corresponds to a portion of a word. Collectively, the constituent phonemes for a word represent the phonetic spelling of the word. Acoustic models also may represent silence and various types of environmental noise.

The words or phrases corresponding to the best matching acoustic models are referred to as recognition candidates. The processor may produce a single recognition candidate (i.e., a single sequence of words or phrases) for an utterance, or may produce a list of recognition candidates.

An acoustic model generally includes data describing how a corresponding speech unit (e.g., a phoneme) is spoken by a variety of speakers. To increase the accuracy with which an acoustic model represents a particular user's speech, and thereby to decrease the incidence of recognition errors, the speech recognition system may modify the acoustic models to correspond to the particular user's speech. This modification may be based on samples of the user's speech obtained during an initial enrollment session and during use of the system.

Enrollment sessions for previous speech recognition systems typically required a user to read from a list of words or to read specific words in response to prompts. For example, DragonDictate® for Windows®, available from Dragon Systems, Inc. of Newton, Mass., included a quick enrollment session that prompted a new user to speak each word of a small set of words, and then adapted the acoustic models based on the user's speech.

Other enrollment approaches also have been used. For example, NaturallySpeaking®, also available from Dragon Systems, Inc. of Newton, Mass., includes an interactive enrollment session in which a new user recites a selected enrollment text. An associated display (e.g., an arrow) indicates the user's position in the text.

SUMMARY

The invention provides non-interactive techniques for enrolling a user in a speech recognition system. Since the techniques are not interactive, the user may record enrollment speech using, for example, a portable recording device, and may later download the speech for processing to refine acoustic models of a speech recognition system. The techniques require the speech to generally correspond to an enrollment text, but permit the user to skip or repeat words, phrases, sentences, or paragraphs of the enrollment text. The techniques involve analyzing the user's speech relative to the enrollment text to identify portions of the speech that match portions of the enrollment text, and updating acoustic models corresponding to the matched portions of the enrollment text using the matching portions of the user's speech. The techniques promise to provide increased flexibility to the enrollment process, and to thereby simplify enrollment.

In one general aspect, a computer enrolls a user in a speech recognition system by obtaining data representing speech by the user and generally corresponding to an enrollment text. The computer analyzes acoustic content of a user utterance, and, based on the analysis, determines whether the user utterance matches a portion of the enrollment text. If the user utterance matches a portion of the enrollment text, the computer uses the acoustic content of the user utterance to update acoustic models corresponding to the portion of the enrollment text. A determination that the user utterance matches a portion of the enrollment text is permitted even when the user has skipped or repeated words, sentences, or paragraphs of the enrollment text.

Implementations may include one or more of the following features. The enrollment procedure is not performed interactively. This means that the data representing the user's speech may be data recorded using a recording device physically separate from the computer. For example, the recording device may be a digital recording device, and obtaining data may include receiving a file from the digital recording device. Obtaining data also may include receiving signals generated by playing back the user's speech using a recording device, such as an analog recording device.

Prior to analyzing a user utterance, the computer may divide the data into groups, with each group representing an utterance by the user.

The computer may designate an active portion of the enrollment text, and may analyze acoustic content of an utterance relative to the active portion of the enrollment text. The computer may identify a position of a previously analyzed utterance in the enrollment text, and may designate the active portion of the enrollment text based on the identified position. The active portion may include text preceding and following the identified position. For example, the active portion may include a paragraph including the position, as well as paragraphs preceding and following that paragraph.

The computer may attempt to match the utterance to models for words included in the active portion of the enrollment text. To this end, the computer may employ an enrollment grammar corresponding to the active portion of the enrollment text.

A rejection grammar may be used to determine whether the user utterance matches a portion of the enrollment text.

The rejection grammar may be a phoneme grammar and may model an utterance using a set of phonemes that is smaller than a set of phonemes used by the enrollment grammar.

The enrollment text may be selected from a group of enrollment texts, with each of the enrollment texts having a corresponding enrollment grammar. An enrollment text also may be received from a user. An enrollment grammar corresponding to the received enrollment text may be generated for use in determining whether the user utterance matches a portion of the enrollment text.

The user utterance may be ignored if it does not match a portion of the enrollment text.

In another general aspect, a user may be enrolled in a speech recognition system by recording the user's speech using a portable recording device and transferring the recorded speech to a computer. The computer then is used to analyze acoustic content of the recorded speech, identify, based on the analysis, portions of the speech that match portions of the enrollment text, and update acoustic models corresponding to matched portions of the enrollment text using acoustic content of matching portions of the speech. The recorded speech may skip or repeat portions of the enrollment text.

Other general aspects include obtaining data corresponding to enrollment text using a physically separate recording device, as well as designating an active portion of the enrollment text and analyzing acoustic content of an utterance relative to the active portion of the enrollment text.

Other features and advantages will be apparent from the following description, including the drawings and the claims.

DESCRIPTION OF DRAWINGS

FIGS. 9 and 10 are charts of scores corresponding to the states of the state graphs of FIGS. 8A, 8B and 8C.

DETAILED DESCRIPTION

Figure 1:
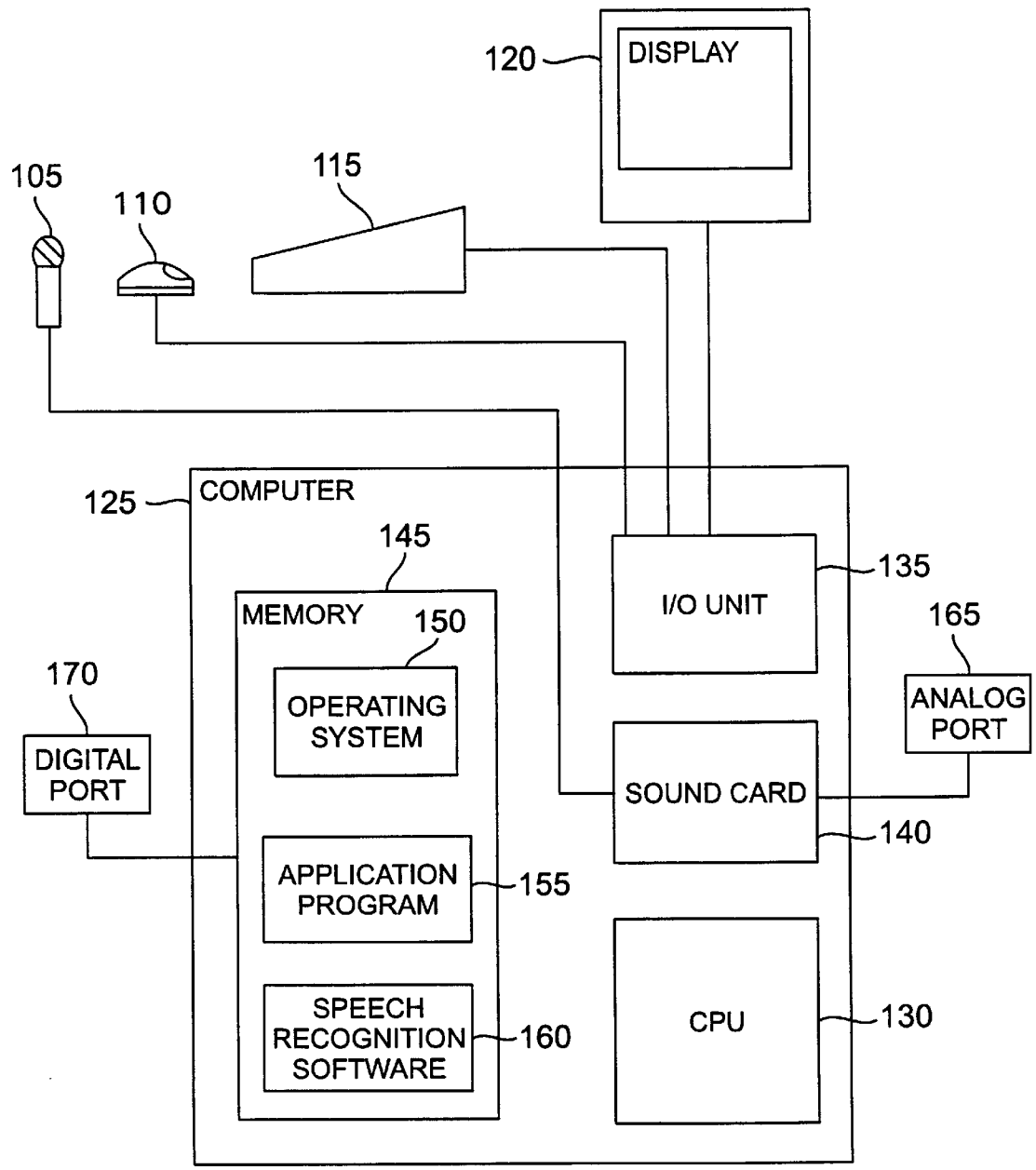
FIG. 1 is a block diagram of a speech recognition system.

Referring to FIG. 1, a speech recognition system 100 includes input/output (I/O) devices (e.g., microphone 105, mouse 110, keyboard 115, and display 120) and a general purpose computer 125 having a processor 130, an I/O unit 135 and a sound card 140. A memory 145 stores data and programs such as an operating system 150, an application program 155 (e.g., a word processing program), and speech recognition software 160.

The microphone 105 receives the user's speech and conveys the speech, in the form of an analog signal, to the sound card 140, which in turn passes the signal through an analog-to-digital (A/D) converter to transform the analog signal into a set of digital samples. Under control of the operating system 150 and the speech recognition software 160, the processor 130 identifies utterances in the user's continuous speech. Utterances are separated from one another by a pause having a sufficiently-large, predetermined duration (e.g., 160–250 milliseconds). Each utterance may include one or more words of the user's speech.

The system also may include an analog recorder port 165 and/or a digital recorder port 170. The analog recorder port 165 is connected to the sound card 140 and is used to transmit speech recorded using a handheld recorder to the sound card. The analog recorder port may be implemented as a microphone positioned so as to be next to the speaker of the handheld recorder when the recorder is inserted into the port 165, and also may be implemented using the microphone 105, or as an analog cable connection. Alternatively, the analog recorder port 165 may be implemented as a tape player that receives a tape recorded using a handheld recorder and transmits information recorded on the tape to the sound card 140.

The digital recorder port 170 may be implemented to transfer a digital file generated using a handheld digital recorder. This file may be transferred directly into memory 145. The digital recorder port 170 may be implemented as a storage device (e.g., a floppy drive) of the computer 125, or as a modem or network card providing an electronic communication from a remote location.

Figure 2:
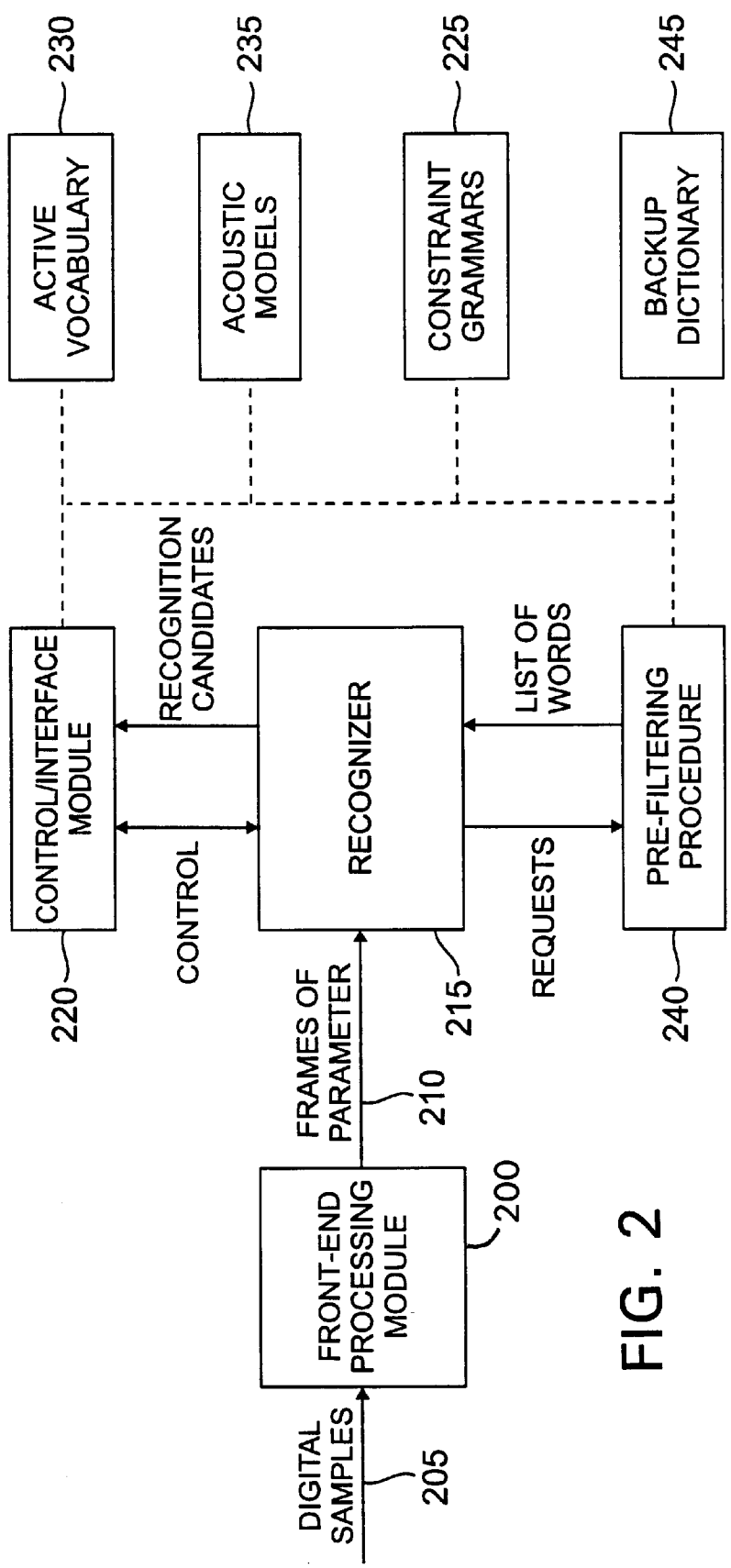
FIG. 2 is a block diagram of speech recognition software of the system of FIG. 1.

FIG. 2 illustrates components of the speech recognition software 160. For ease of discussion, the following description indicates that the components carry out operations to achieve specified results. However, it should be understood that each component actually causes the processor 130 to operate in the specified manner.

Initially, a front end processing module 200 converts the digital samples 205 from the sound card 140 (or from the digital recorder port 170) into frames of parameters 210 that represent the frequency content of an utterance. Each frame includes 24 parameters and represents a short portion (e.g., 10 milliseconds) of the utterance.

Figure 3:
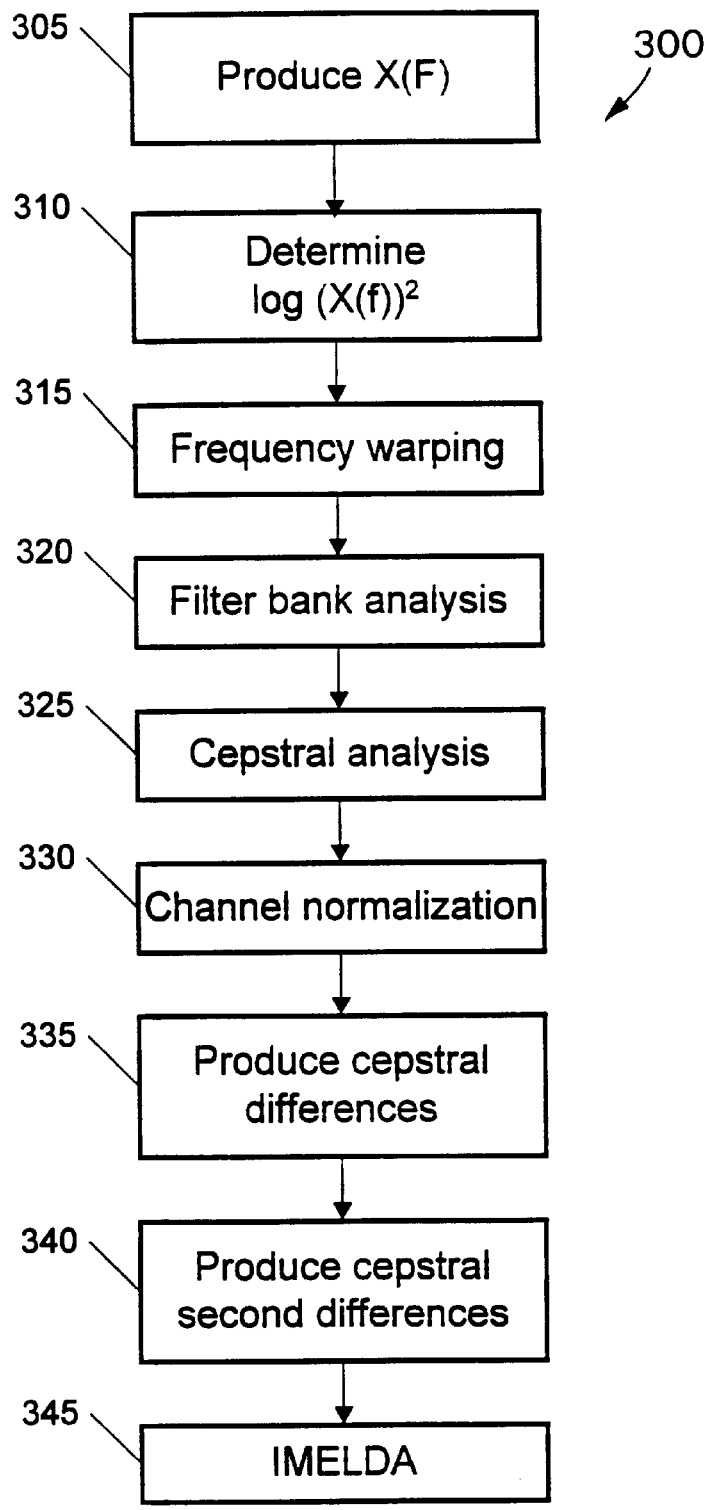
FIG. 3 is a flow chart of a signal processing procedure performed by the software of FIG. 2.

As shown in FIG. 3, the front end processing module 200 produces a frame from digital samples according to a procedure 300. The module first produces a frequency domain representation $X(f)$ of the portion of the utterance by performing a Fast Fourier Transform (FFT) on the digital samples (step 305). Next, the module determines $\log(X(f))^2$ (step 310). The module may then perform frequency warping (step 315) and a filter bank analysis (step 320) to achieve speaker normalization. See S. Wegmann et al., "Speaker Normalization on Conversational Speech," *Proc.* 1996 *ICASSP*, pp. I.339–I.341, which is incorporated by reference. In general, speaker normalization is used only after acoustic models have been adapted to a particular speaker using an enrollment program as described below.

From the normalized results, the module performs cepstral analysis to produce twelve cepstral parameters (step 325). The module generates the cepstral parameters by performing an inverse cosine transformation on the logarithms of the frequency parameters. Cepstral parameters and cepstral differences (described below) have been found to emphasize information important to speech recognition more effectively than do the frequency parameters. After performing channel normalization of the cepstral parameters (step 330), the module produces twelve cepstral differences (i.e., the differences between cepstral parameters in successive frames) (step 335) and twelve cepstral second differences (i.e., the differences between cepstral differences in successive frames) (step 340). Finally, the module performs an IMELDA linear combination transformation to select the twenty four most useful parameters from the twelve cepstral parameters, the twelve cepstral differences, and the twelve cepstral second differences (step 345).

Referring again to FIG. 2, a recognizer 215 receives and processes the frames of an utterance to identify text corresponding to the utterance. The recognizer entertains several hypotheses about the text and associates a score with each hypothesis. The score reflects the probability that a hypothesis corresponds to the user's speech. For ease of processing, scores are maintained as negative logarithmic values. Accordingly, a lower score indicates a better match (a high probability) while a higher score indicates a less likely match (a lower probability), with the likelihood of the match decreasing as the score increases. After processing the utterance, the recognizer provides the best-scoring hypotheses to the control/interface module 220 as a list of recognition candidates, where each recognition candidate corresponds to a hypothesis and has an associated score. Some recognition candidates may correspond to text while other recognition candidates correspond to commands.

The recognizer 215 processes the frames 210 of an utterance in view of one or more constraint grammars 225. A constraint grammar, also referred to as a template or restriction rule, may be a limitation on the words that may correspond to an utterance, a limitation on the order or grammatical form of the words, or both. For example, a constraint grammar for menu-manipulation commands may include only entries from the menu (e.g., "file", "edit") or command words for navigating through the menu (e.g., "up", "down", "top", "bottom"). Different constraint grammars may be active at different times. For example, a constraint grammar may be associated with a particular application program 155 and may be activated when the user opens the application program and deactivated when the user closes the application program. The recognizer 215 discards any hypothesis that does not comply with an active constraint grammar. In addition, the recognizer 215 may adjust the score of a hypothesis associated with a particular constraint grammar based on characteristics of the constraint grammar.

One constraint grammar 225 that may be used by the speech recognition software 160 is a large vocabulary dictation grammar. The large vocabulary dictation grammar identifies words included in the active vocabulary 230, which is the vocabulary of words known to the software. The large vocabulary dictation grammar also indicates the frequency with which words occur. A language model associated with the large vocabulary dictation grammar may be a unigram model that indicates the frequency with which a word occurs independently of context, or a bigram model that indicates the frequency with which a word occurs in the context of a preceding word. For example, a bigram model may indicate that a noun or adjective is more likely to follow the word "the" than is a verb or preposition.

The active vocabulary 230 uses a pronunciation model in which each word is represented by a series of phonemes that comprise the phonetic spelling of the word. Each phoneme may be represented as a triphone, a context-dependent phoneme, that includes three nodes. For example, the triphone "abc" represents the phoneme "b" in the context of the phonemes "a" and "c", with the phoneme "b" being preceded by the phoneme "a" and followed by the phoneme "c".

The phonemes are represented by acoustic models 235. In the case of triphones, the acoustic models 235 represent each triphone node as a mixture of Gaussian probability density functions ("PDFs"). For example, node "i" of a triphone "abc" may be represented as $ab^ic$:

$$ab^ic = \sum_k w_k N(\mu_k, c_k),$$

where each $w_k$ is a mixture weight, $$\sum_k w_k = 1,$$

$\mu_k$ is a mean vector for the probability density function ("PDF") $N_k$, and $c_k$ is the covariance matrix for the PDF $N_k$. Like the frames in the sequence of frames, the vectors $\mu_k$ each include twenty four parameters. The matrices $c_k$ are twenty four by twenty four matrices. Each triphone node may be represented as a mixture of up to, for example, sixteen different PDFs.

A particular PDF may be used in the representation of multiple triphone nodes. Accordingly, the acoustic models 235 represent each triphone node as a collection of mixture weights $w_k$ associated with up to sixteen different PDFs $N_k$, and separately represent each PDF $N_K$ using a mean vector $\mu_k$ and a covariance matrix $c_k$. Use of a particular PDF to represent multiple triphone nodes permits the models to include a smaller number of PDFs than would be required if each triphone node included entirely separate PDFs. Since the English language may be roughly represented using 43 different phonemes, there may be up to 79,507 ($43^3$) different triphones, which would result in a huge number of PDFs if each triphone node were represented by a separate set of PDFs. Representing multiple nodes with common PDFs also may remedy or reduce a data sparsity problem that results because some triphones (e.g., "tzp" in the English language) rarely occur. These rare triphones may be represented by having closely-related triphones share the same set of PDFs.

A large vocabulary dictation grammar may include multiple dictation topics (e.g., "medical" or "legal"), each having its own vocabulary file and its own language model. A dictation topic includes a set of words which represents the active vocabulary 230. In a typical example, a topic may include approximately 30,000 words that are considered for normal recognition.

A complete dictation vocabulary consists of the active vocabulary 230 plus a backup vocabulary 245. The backup vocabulary may include files that contain user-specific backup vocabulary words and system-wide backup vocabulary words.

User-specific backup vocabulary words include words which a user has created while using the speech recognition software. These words are stored in vocabulary files for the user and for the dictation topic, and are available as part of the backup dictionary for the dictation topic regardless of user, and to the user regardless of which dictation topic is being used. For example, if a user is using a medical topic and adds the word "ganglion" to the dictation vocabulary, any other user of the medical topic will have immediate access to the word "ganglion". In addition, the word will be written into the user-specific backup vocabulary. Then, if the user says "ganglion" while using a legal topic, the word "ganglion" will be available during correction from the backup dictionary.

In addition to the user-specific backup vocabulary noted above, there is a system-wide backup vocabulary. The system-wide backup vocabulary contains all the words known to the system, including words which may currently be in an active vocabulary.

During error correction, word searches of the backup vocabularies start with the user-specific backup vocabulary and then check the system-wide backup vocabulary. The backup vocabularies also are searched when there are new words in text that a user has typed.

Figure 4A:
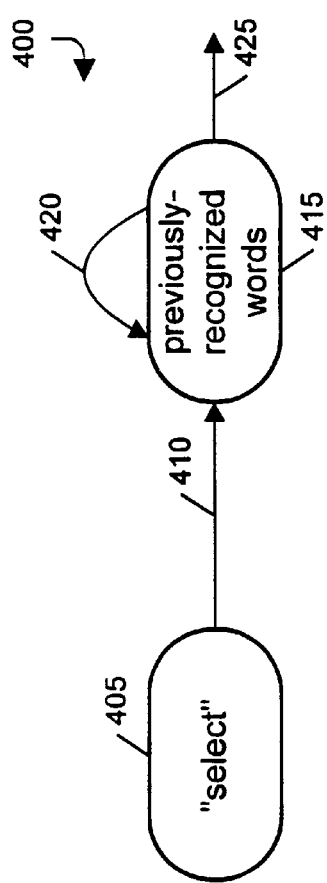
FIGS. 4A and 4B are state diagrams of a constraint grammar.
Figure 4B:
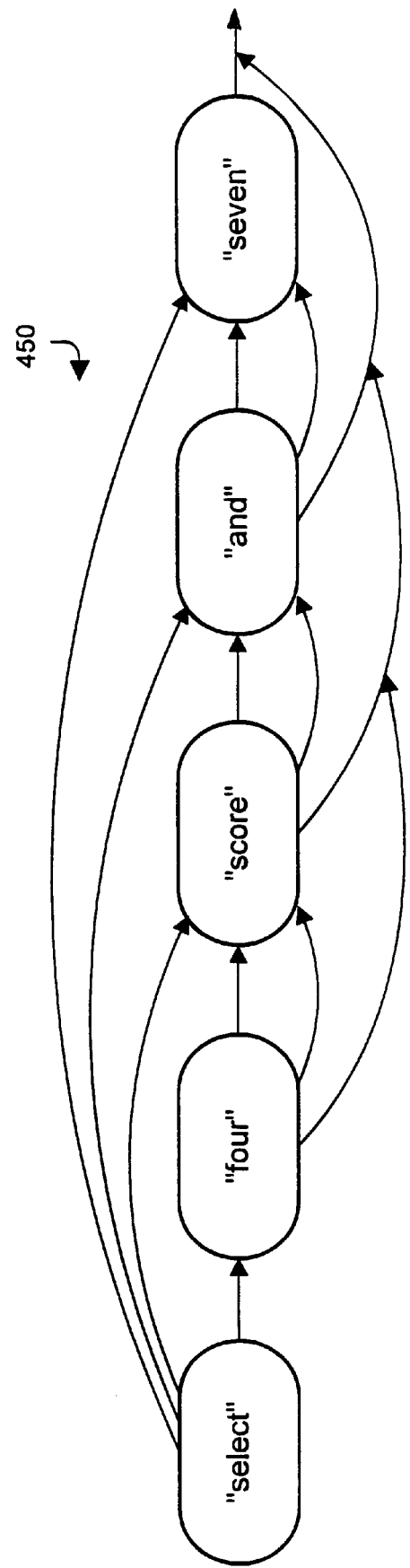

FIG. 4A illustrates an example of a constraint grammar for a "select" command used to select previously recognized text. As shown, a constraint grammar may be illustrated as a state diagram 400. The "select" command includes the word "select" followed by one more previously-recognized words, with the words being in the order in which they were previously recognized. The first state 405 of the constraint grammar indicates that the first word of the select command must be "select". After the word "select", the constraint grammar permits a transition along a path 410 to a second state 415 that requires the next word in the command to be a previously-recognized word. A path 420, which returns to the second state 415, indicates that the command may include additional previously-recognized words. A path 425, which exits the second state 415 and completes the command, indicates that the command may include only previously-recognized words. FIG. 4B illustrates the state diagram 450 of the constraint grammar for the select command when a previously-recognized utterance is "four score and seven". This state diagram could be expanded to include words from additional utterances.

The constraint grammar also may be expressed in Backus-Naur Form (BNF) or Extended BNF (EBNF). In EBNF, the grammar for the "Select" command is:

<recognition result>::=Select <word>,
where
<word>::=[PRW$^1$[PRW$^2$[PRW$^3$ ... PRW$^n$]]]¦
[PRW$^2$[PRW$^3$ ... PRW$^n$]]¦ ... [PRW$^n$],
"PRW$^i$" is the previously-recognized word i,
[ ] means optional,
< > means a rule,
¦ means an OR function, and
::= means "is defined as" or "is".

As illustrated in FIGS. 4A and 4B, this notation indicates that "select" may be followed by any ordered sequence of previously-recognized words. Constraint grammars are discussed further in U.S. application Ser. No. 08/559,207, entitled "CONTINUOUS RECOGNITION OF SPEECH AND COMMANDS" and filed Nov. 13, 1995, which is incorporated by reference.

Other constraint grammars 225 include an in-line dictation macros grammar for dictation commands, such as "CAP" or "Capitalize" to capitalize a word and "New-Paragraph" to start a new paragraph; the select X Y Z grammar used in selecting text and discussed above; an error correction commands grammar; a dictation editing grammar; an application command and control grammar that may be used to control a particular application program 155; a global command and control grammar that may be used to control the operating system 150 and the speech recognition software 160; a menu and dialog tracking grammar that may be used to manipulate menus; and a keyboard control grammar that permits the use of speech in place of input devices, such as the keyboard 115 or the mouse 110.

Referring again to FIG. 2, the recognizer 215 may operate in parallel with a pre-filtering procedure 240. Upon initiating processing of an utterance, the recognizer 215 requests from the pre-filtering procedure 240 a list of words that may have been spoken as the first word of the utterance (i.e., words that may correspond to the first and subsequent frames of the utterance). The pre-filtering procedure 240 performs a coarse comparison of the sequence of frames with the active vocabulary 230 to identify a subset of the vocabulary for which a more extensive comparison using the recognizer is justified.

Figure 5:
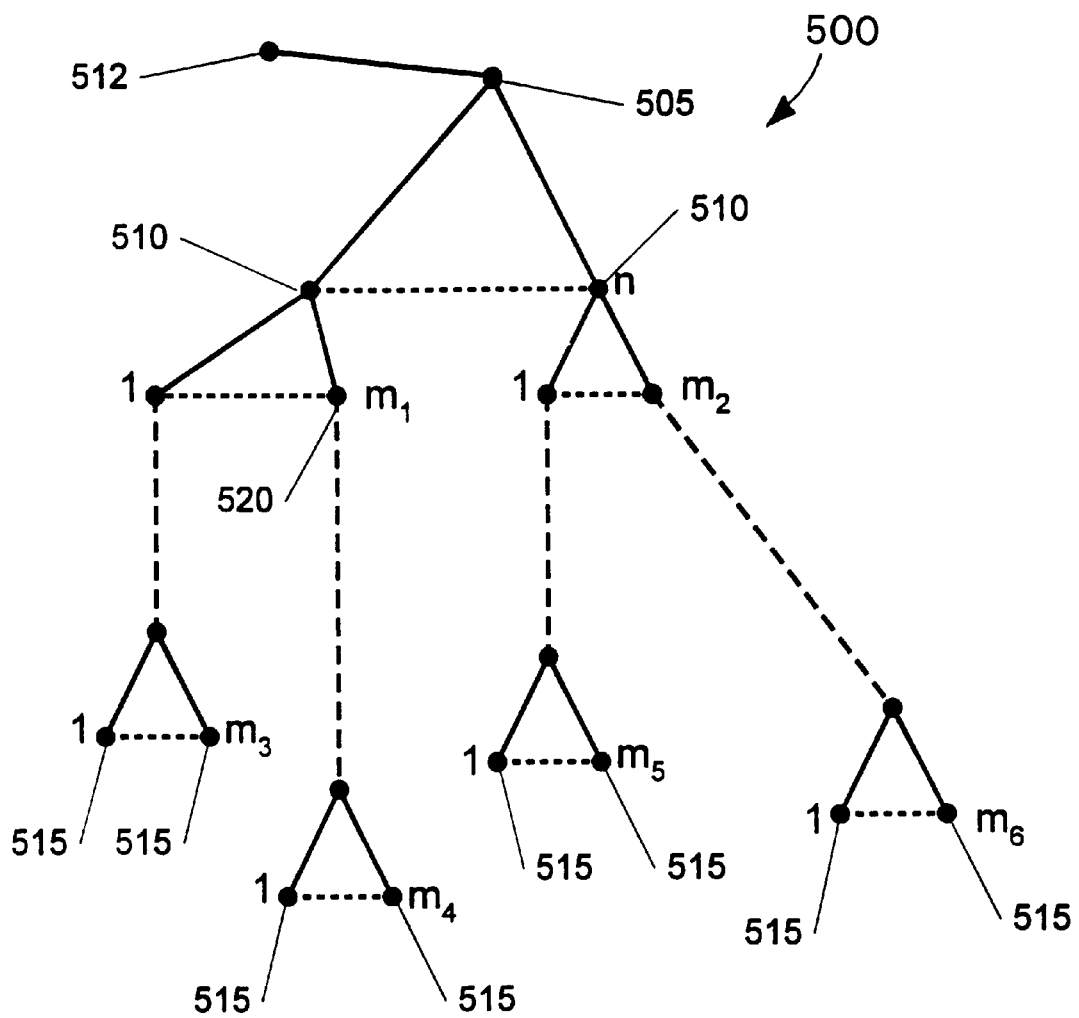
FIG. 5 is a graph of a lexical tree.
Figure 6:
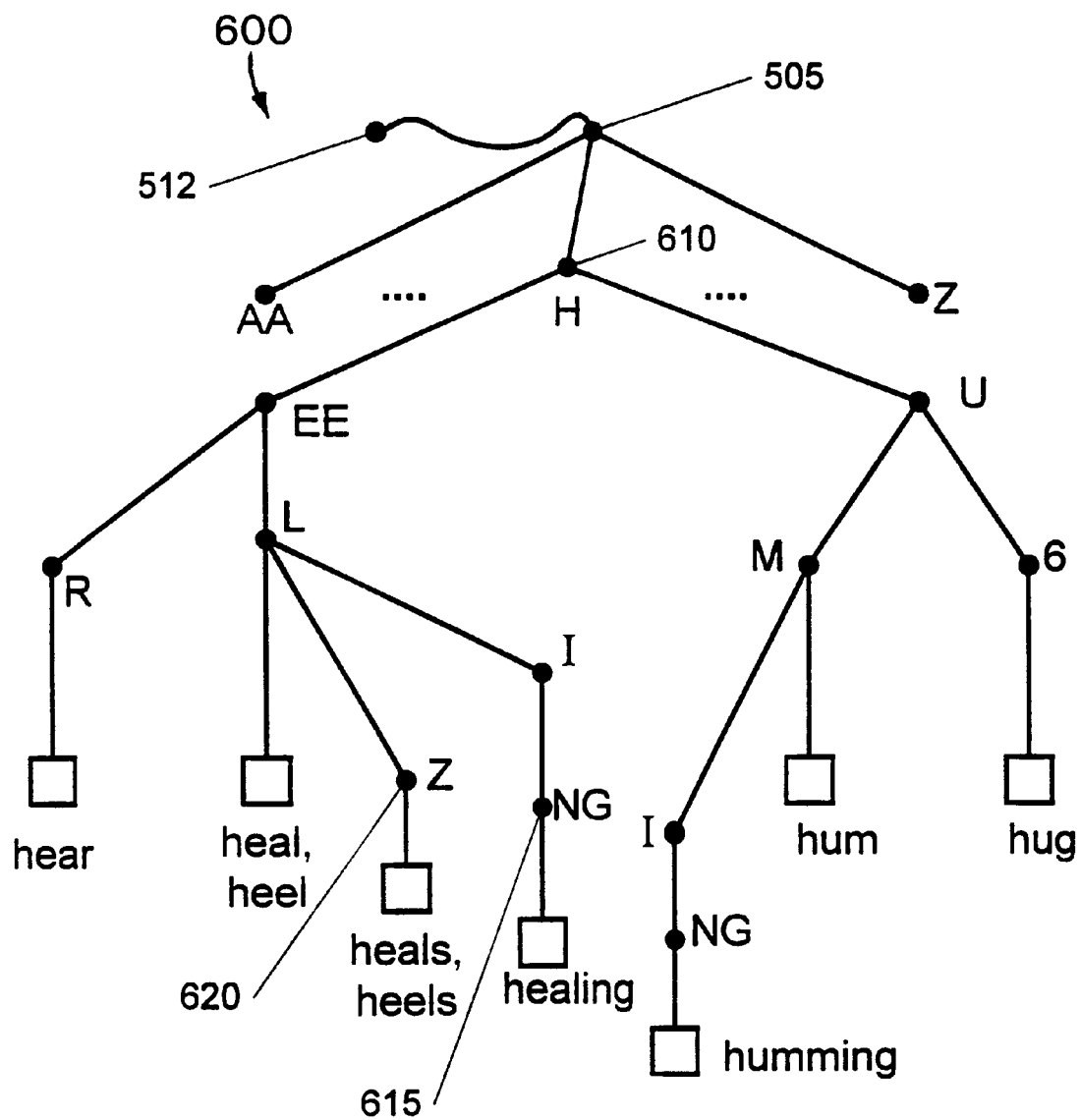
FIG. 6 is a graph of a portion of the lexical tree of FIG. 5.

Referring to FIGS. 5 and 6, the pre-filtering procedure 240 uses a lexical tree 500 that is initialized before processing begins. The lexical tree represents the active vocabulary 230 based on the phonetic relationships between words in the vocabulary. The lexical tree includes a root node 505 that represents new words entering the lexical tree. From the root node 505, the tree expands to a group 510 of nodes that correspond to phonemes with which words start. A silence node 512 that represents silence also may be reached from the root node 505.

Each node in the group 510 represents a phoneme that appears at the beginning of one or more words. For example, in the portion 600 of the lexical tree 500 illustrated in FIG. 6, a node 610 corresponds to all words in the vocabulary that start with the phoneme "H". Together, the nodes in the group 510 include representations of the starting phoneme of every word in the vocabulary.

The lexical tree continues to expand until it reaches leaf nodes 515 that represent the actual words of the vocabulary. For example, as indicated by the square marker, leaf node 615 of FIG. 6 corresponds to the word "healing". An internal node of the tree also may represent a word of the vocabulary. For example, the node 520 might represent a particular vocabulary word in addition to representing the first two phonemes of other vocabulary words. Similarly, the leaf node 620 of FIG. 6 corresponds to the words "heal" and "heel" while also corresponding to the first three phonemes of the words "heals", "heels" and "healing". Node 620 also illustrates that, since multiple words may have the same phonetic spelling, a leaf node may correspond to more than one word. As illustrated in FIG. 6, leaf nodes may appear at different levels within the lexical tree. Leaf nodes also may correspond to commands. For example, a leaf node may correspond to the word "select" and to the command "SELECT". As noted above, commands may be associated with particular constraint grammars 225.

Figure 7:
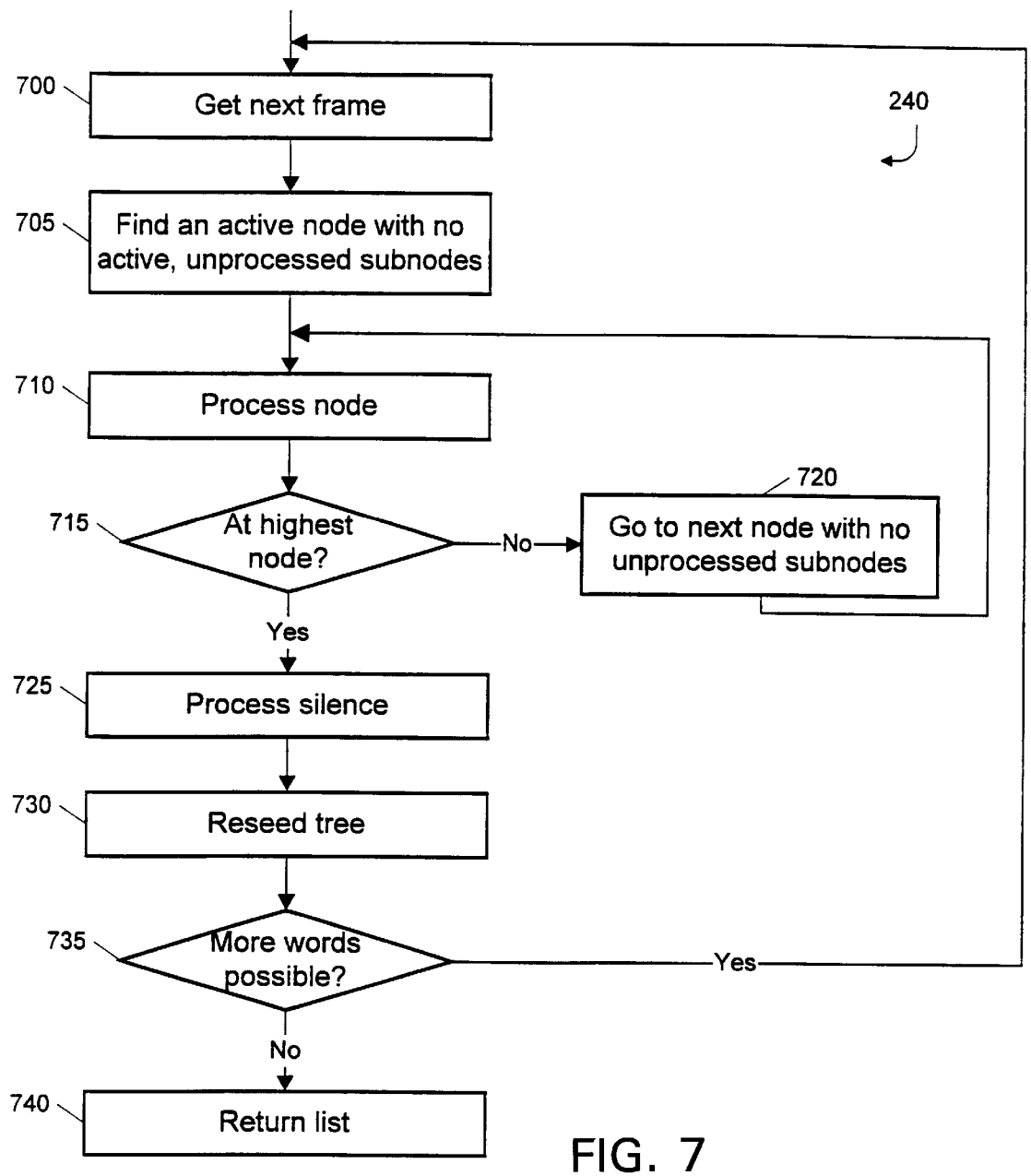
FIG. 7 is a flow chart of a pre-filtering procedure performed by the software of FIG. 2.

Operation of the pre-filtering procedure 240 is illustrated in FIG. 7. The pre-filtering procedure begins by retrieving the next frame of parameters for an utterance (step 700). Immediately after initialization, the next frame will be the first frame for the utterance. Thereafter, the next frame will be the frame following the last frame that was processed by the pre-filtering procedure when the pre-filtering procedure was last called. The pre-filtering procedure does not reinitialize the lexical tree between requests for list of words. Accordingly, the state of the lexical tree when a list of words is requested corresponds to the state of the lexical tree after a previous list of words was returned.

After retrieving a frame of data, the pre-filtering procedure finds an active node in the tree with no unprocessed active successors (step 705). Successors of a node also may be referred to as subnodes of the node. When the lexical tree is initialized, the silence node 512 is the only active node.

Next, the pre-filtering procedure processes the current node (step 710) according to a node-processing procedure 1100 that is discussed below with reference to FIG. 11. The node-processing procedure determines whether the node should spawn additional active nodes and whether the node should be rendered inactive. If the node is a leaf node, the node-processing procedure also determines whether the word corresponding to the node should be added to a word list for a time associated with the node.

After processing the node (step 710), the pre-filtering procedure determines whether the node is the highest node in the tree (i.e., the root node) (step 715). If the node is not the highest node, then the pre-filtering procedure goes to the next node having no unprocessed active subnodes (step 720) and processes that node (step 710). When searching for the next node to process, the pre-filtering procedure considers inactive nodes having active subnodes or active siblings.

If the processed node is the highest active node (step 715), then the pre-filtering procedure processes the silence node 512 (step 725). In general, the silence node is processed by comparing a frame to a model for silence and adding the resulting score to the minimum of the current score for the silence node and the score for the root node 505.

Next, the pre-filtering procedure reseeds the lexical tree (step 730). The pre-filtering procedure reseeds the tree whenever the silence node 512 is active or a word was produced by a leaf node of the lexical tree, regardless of whether the word was added to the list of words. The pre-filtering procedure reseeds the tree by replacing the score for the root node 505 with the minimum of the score for the silence node 512 and the scores for any words produced by leaf nodes of the lexical tree for the current frame. If the silence node is inactive and no leaf node has produced a word, then the pre-filtering procedure replaces the score for the root node 505 with a bad score (i.e., a score having a value larger than a pruning threshold).

Next, the pre-filtering procedure determines whether more words may be added to the word list for the requested time (step 735). If there are no active nodes in the lexical tree corresponding to speech that started at, before, or slightly after the start time for which the list was requested, and if the last frame to be processed corresponds to a time that is slightly after the start time for which the list was requested, then no more words may be added to the word list. A word produced by the lexical tree is added to the list of words corresponding to the start time of the word and to lists of words corresponding to times that precede and follow the start time of the word. It is for this reason that the pre-filtering procedure waits until there are no active nodes in the tree corresponding to speech that started slightly after the start time for the list of words. If more words may be added, then the pre-filtering procedure retrieves the next frame of parameters (step 700) and repeats the steps discussed above.

If words cannot be added to the word list (step 735), then the pre-filtering procedure returns the word list (step 740) to the recognizer 215. If the word list includes more than a predefined number of words, then the pre-filtering procedure removes words from the list prior to returning the list. The pre-filtering procedure removes the words that are least likely to correspond to the user's speech and removes enough words to reduce the number of words on the list to the predefined number. The procedure also deletes any lists of words for times prior to the requested start time.

Figure 8A:
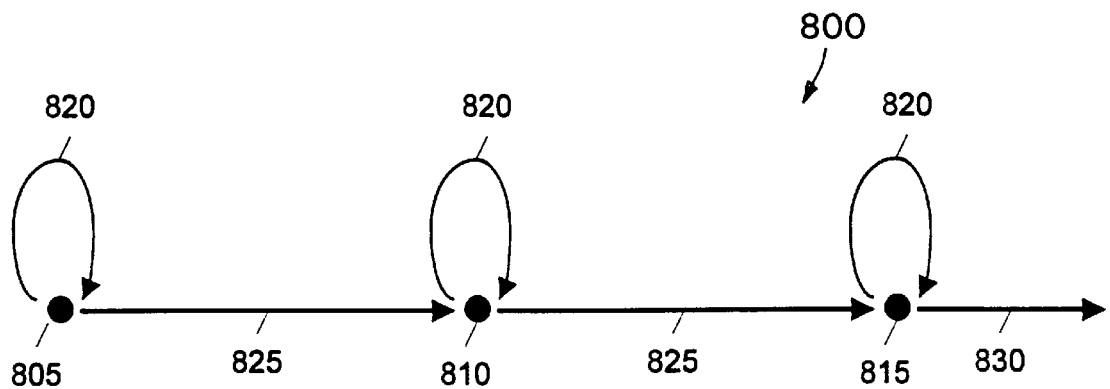
FIGS. 8A, 8B and 8C are state graphs representing nodes of the lexical tree of FIG. 5.

Each node of the lexical tree 500 (FIG. 5) represents a sequence of states for a particular phoneme. For example, FIG. 8A illustrates a node 800 that includes a first state 805, a second state 810, and a third state 815. A comparison with a frame of parameters may cause the score in a particular state to remain in the state (through a path 820). A score remains in the state when the score, after being adjusted based on a comparison with a model for the state, is better than a score passed from a preceding state or node, or when no score is passed from a preceding state or node. The comparison also may cause the score to be passed to a subsequent state through a path 825. A score is passed to a subsequent state when the score, after being adjusted based on a comparison with a model for the subsequent state, is better than the score in the subsequent state, or when no score is associated with the subsequent state. The score for the third state 815 may be passed to one or more subsequent nodes through a path 830.

Figure 8B:
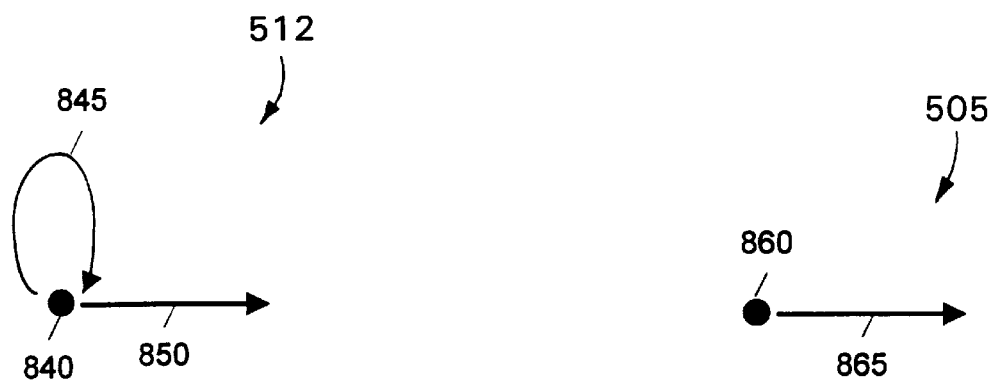

Referring to FIG. 8B, the node 512 that corresponds to silence is represented by a single state 840. Each comparison with a frame of parameters may cause a score in the node to remain in the state 840 (through the path 845) and also may cause the score to be passed to the root node 505 through a path 850.

Figure 8C:
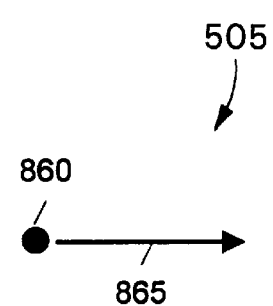

Referring to FIG. 8C, the root node 505 is represented by a single state 860. Comparison with a frame causes the score in the node to be passed to one or more subsequent nodes (including the silence node 512) through a path 865.

Each state of a node may be represented by four values: a score, a starting time, a leaving penalty, and a staying penalty. The score represents the likelihood that a series of frames has placed the lexical tree in the state (i.e., the probability that the series of frames corresponds to the word or portion of a word to which the state corresponds). The scores are maintained as negative logarithmic values.

The starting time identifies the hypothesized time at which the user began to speak the word or words represented by the state. In particular, the starting time identifies the time at which the score associated with the state entered the lexical tree (i.e., the time at which the score was passed from the state 840 along the path 850).

The leaving and staying penalties are fixed values associated with the state. The staying penalty is added to any score that stays in the state. The staying penalty is related inversely to the length of the sound represented by the state and to the length of the phoneme represented by the node to which the state belongs. For example, the staying penalty could be proportional to $-\log(1-1/d_{avg})$, where $d_{avg}$ is the average duration, in frames, of the sound represented by the state. Thus, the staying penalty has a relatively large value when the sound corresponding to the state occurs for only a small amount of time and a relatively small value when the sound corresponding to the state occurs for a large amount of time.

The leaving penalty is added to any score that exits the state, and includes a duration component and a language model component. The duration component is related directly to the length of the sound represented by the state and to the length of the phoneme represented by the node to which the state belongs. For example, the duration component of the leaving penalty could be proportional to $-\log(1/d_{avg})$. Thus, the duration component of the leaving penalty has a relatively large value when the sound corresponding to the state occurs for a large amount of time and a relatively small value when the sound corresponding to the state occurs for a small amount of time.

The language model components of the leaving penalties for all states in a particular node together represent a language model score for the phoneme associated with that node. The language model score represents the likelihood that a word including the phoneme will occur in speech. The language model score included in the leaving penalties for a node is the increase in the best language model score for the branch of the lexical tree that begins with the node relative to the branch of the lexical tree that begins with the node's parent.

The following discussion assumes that there are no leaving or staying penalties associated with the state 840 or the state 860. The same result could be achieved by setting the leaving and staying penalties for states 840 and 860 equal to zero. The following discussion also assumes that the first frame is the first frame that may correspond to speech instead of silence.

FIG. 9 provides a simplified example of how scores propagate through the lexical tree. Before the first frame is retrieved (row 900), state 840 (which corresponds to silence) has a score of 0 and no other nodes are active. The score of 0 means that there is a one hundred percent probability that the system is starting from silence.

After the first frame is retrieved (row 905), the score for the state 840 ($S_{A1}$) is set equal to the acoustic score ($A_{A1}$) resulting from an acoustic match of the first frame with an acoustic model corresponding to the state 840 (i.e., the acoustic model for silence). Thus, the score for the state 840 ($S_{A1}$) is set equal to the likelihood that the first frame corresponds to silence.

Retrieval of the first frame also causes the state 805 to become an active state. Assuming that the node 800 corresponds to a phoneme that starts a word, the score for the state 805 ($S_{B1}$) is set equal to the acoustic score ($A_{B1}$) resulting from an acoustic match of the first frame with the acoustic model corresponding to the state 805. Thus, the score for the state 805 ($S_{B1}$) is set equal to the likelihood that the first frame corresponds to the state 805. The starting time for the state 805 is set equal the time associated with the first frame. This value for the starting time indicates that the score at state 805 represents a word that started at a time corresponding to the first frame. The starting time moves with the score as the score propagates through the lexical tree.

After the second frame is retrieved (row 910), the score for the state 840 ($S_{A2}$) is set equal to the sum of the previous score for the state ($S_{A1}$) and the acoustic score ($A_{A2}$) resulting from an acoustic match of the second frame with the acoustic model for silence:

$$S_{A2}=S_{A1}+A_{A2}=A_{A1}+A_{A2}.$$

As noted above, each of the scores corresponds to a negative logarithmic probability. Accordingly, adding scores together corresponds to multiplying the probabilities. Thus, the score for the state 840 ($S_{A2}$) equals the likelihood that both of the first and second frames correspond to silence. This process is repeated for subsequent frames (e.g., lines 915 and 920) so that the score for the state 840 at a frame "n" ($S_{An}$) equals:

$$S_{An} = S_{An-1} + A_{An} = \sum_{m=1}^{n} A_{Am}.$$

This expression assumes that the silence node 512 is not reseeded from the root node 505. If reseeding occurs at a frame n, then the value of $S_{An-1}$ would be replaced by the score in the root node 505 for the frame n−1.

After the second frame is retrieved, the score for the state 805 ($S_{B2}$) is set equal to:

$$S_{B2}=\min(S_{B1}+\text{stay}_B, S_{A1})+A_{B2},$$

where $A_{B2}$ is the acoustic score resulting from an acoustic match of the second frame with the acoustic model corresponding to state 805 and $\text{stay}_B$ is the staying penalty for state 805. The score for state 805 ($S_{B2}$) corresponds to the more likely of two alternatives: (1) the first frame was silence and the second frame was the sound represented by the state 805 or (2) both of the first and second frames were the sound represented by the state 805. The first alternative corresponds to a transition from state 840 to state 805 along the path 850. The second alternative corresponds to a transition from state 805 back to state 805 along path 820. When the first alternative is the more likely, the starting time corresponding to the first frame that was stored previously for the state 805 is replaced by a value corresponding to the second frame. This value indicates that the score at state 805 represents a word that started with the second frame.

After the second frame is retrieved, the state 810 becomes an active state. The score for the state 810 ($S_{C2}$) is set equal to:

$$S_{C2}=S_{B1}+\text{leave}_B+A_{C2},$$

where $A_{C2}$ is the acoustic score resulting from an acoustic match of the second frame with the acoustic model corresponding to state 810 and $\text{leave}_B$ is the leaving penalty for the state 805. Similarly, $\text{leave}_C$ and $\text{leave}_D$ are leaving penalties for, respectively, states 810 and 815. The sum of language model components of $\text{leave}_B$, $\text{leave}_C$ and $\text{leave}_D$ represents the language model score for the phoneme represented by the node 800.

The methodology for determining state scores for states other than the silence state can be expressed more generally as:

$$S_{i,j}=\min(S_{i,j-1}+\text{stay}_i, S_{i-1,j-1}+\text{leave}_{j-1})+A_{i,j}.$$

for i greater than zero (where i equals zero corresponds to silence), and with the boundary condition that the score for an inactive state equals infinity or some sufficiently large value. The starting time for the state may be represented as:

$$t_{i,j}=t_{i,j-1} \text{ for } S_{i,j-1}+\text{stay}_i \leq S_{i-1},j-1+\text{leave}_{j-1},$$

or $$t_{i,j}=t_{i-1,j-1} \text{ for } S_{i,j-1}+\text{stay}_i > S_{i-1},j-1+\text{leave}_{j-1},$$

for i and j greater than zero and with the boundary condition that the time value for a newly active state represents the frame at which the state became active. As previously noted, state scores for the silence state may be determined as:

$$S_{0,j} = S_{0,j-1} + A_{0,j} = \sum_{m=1}^{j} A_{0,m}.$$

with the boundary condition that $S_{0,0}$ equals zero. An even more general form, in which the scores are expressed as functions of the various parameters, is illustrated in FIG. 10.

Figure 11:
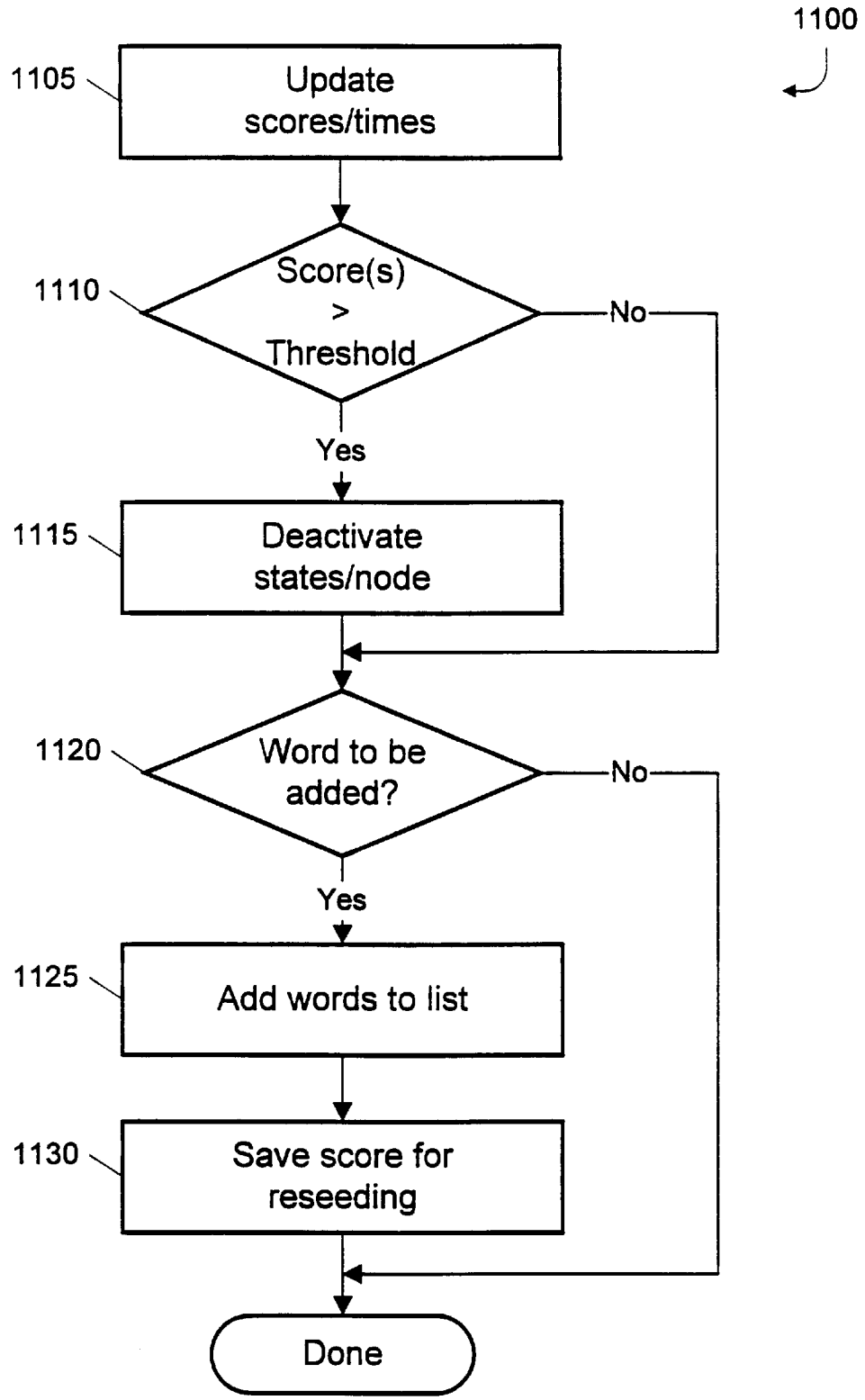
FIG. 11 is a flow chart of a procedure for processing nodes of a lexical tree.

Referring to FIG. 11, a node may be processed according to a node-processing procedure 1100. Initially, the node-processing procedure updates the scores and time values for each state of the node (step 1105). The node-processing procedure updates the scores and time values by generating acoustic scores and using the equations discussed above.

When the last state of the node was active prior to updating the scores for the node, the node-processing procedure uses the score for the last state to generate scores for any inactive subnodes of the node. If the generated score for a subnode does not exceed a pruning threshold, then the node-processing procedure activates that subnode and provides the subnode with the generated score.

Next, the node-processing procedure determines whether the score of any state of the node exceeds the pruning threshold (step 1110). When a score exceeds the pruning threshold, the likelihood that the word represented by the score was spoken is deemed to be too small to merit further consideration. For this reason, the procedure prunes the lexical tree by deactivating any state having a score that exceeds the pruning threshold (step 1115). If every state of the node is deactivated, then the node-processing procedure also deactivates the node. The node-processing procedure may deactivate a node or state by deleting a record associated with the node or state, or by indicating in the record that the node or state is inactive. Similarly, the node-processing procedure may activate a node or state by creating a record and associating the record with the node or state, or by indicating in an existing record that the node or state is active. The procedure may use a dynamic pruning threshold that accounts for variations in the average or best score in the lexical tree at any given time.

Next, the node-processing procedure determines whether a word is to be added to a list of words (step 1120). A word is added to the list of words when the node being processed corresponds to the last phoneme of a word, a score has been propagated out of the last state of the node, and the score is less than a list threshold. Before comparing the score to the list threshold, the node-processing procedure adds a language model score to the score. The language model score corresponds to the difference between the language model score for the word and the incremental language model score that is already included in the score. In general, the list threshold has a lower value than the pruning threshold. If the node being processed corresponds to the last phoneme of multiple words having the same phonetic spelling, then all of the words to which the node corresponds are added to the list of words.

If the noted conditions are met, the node-processing procedure adds the word or words to the list (step 1125). A word is stored in the list of words along with the score propagated out of the last state. If the word is on the list already, then the node-processing procedure stores with the list the better of the score already stored with the list or the score propagated out of the last state. The scores for words in a list of words are returned along with the list of words. The recognizer 215 uses these scores in making the detailed match.

The node-processing procedure also adds the word to lists of words for times that precede or follow the starting time to account for possible inaccuracies in the starting time of the word that may result from selecting the better of a score that remains in a state or a score propagated from a prior state. Spreading the word across multiple lists ensures that these inaccuracies will not impinge on the accuracy of the speech recognition system. The node-processing procedure spreads the word across multiple lists based on the length of the word.

After adding a word to the list of words (step 1125), the node-processing procedure saves the score associated with the word as a reseeding score for use in reseeding the tree (step 1130). Production of a word by the lexical tree means that the current frame may correspond to the last frame of the word (with the probability of such a correspondence being reflected by the score associated with the word). This means that the next frame may correspond to the beginning of a word or to silence resulting from a pause between words. The pre-filtering procedure reseeds the tree (step 730 of FIG. 7) to account for this possibility.

For a given frame, multiple nodes may produce words. However, the tree only needs to be reseeded once. To account for this, the node-processing procedure only saves the score associated with a word ($S_w$) as the reseeding score ($S_{RS}$) if the word is the first word to be generated by the tree for the current frame of if the word score is less than the score for all other words generated by previously-processed nodes for the current frame ($S_{RS}'$):

$$S_{RS} = \min(S_w, S_{RS}').$$

Saving only the lowest score (i.e., the score indicating the highest probability that the current frame was the last frame of a word) ensures that the tree will be reseeded using the highest probability that the next frame is the first frame of a new word.

To reseed the tree (step 730 of FIG. 7), the pre-filtering procedure activates the root node 505 and associates the minimum of the reseeding score ($S_{RS}$) and the score for the silence node 512 with the root node. During processing of the next frame, the active root node 505 may be used to activate nodes in the group 510 or to activate the silence node 512.

Processing of the node is complete after the node-processing procedure saves a score for use in reseeding the tree (step 1130), or if no word is to be added to the list of words (step 1120). The lexical tree pre-filtering procedure is discussed in detail in U.S. application Ser. No. 08/701,393, entitled "LEXICAL TREE PRE-FILTERING IN SPEECH RECOGNITION" and filed Aug. 22, 1996, which is incorporated by reference.

After the pre-filtering procedure responds with the requested list of words, the recognizer initiates a hypothesis for each word from the list and compares acoustic models for the word to the frames of parameters representing the utterance. The recognizer uses the results of these comparisons to generate scores for the hypotheses. Hypotheses having excessive scores are eliminated from further consideration. As noted above, hypotheses that comply with no active constraint grammar also are eliminated.

When the recognizer determines that a word of a hypothesis has ended, the recognizer requests from the pre-filtering procedure a list of words that may have been spoken just after the ending-time of the word. The recognizer then generates a new hypotheses for each word on the list, where each new hypothesis includes the words of the old hypothesis plus the corresponding new word from the list.

In generating the score for a hypothesis, the recognizer uses acoustic scores for words of the hypothesis, a language model score that indicates the likelihood that words of the hypothesis are used together, and scores provided for each word of the hypothesis by the pre-filtering procedure. The scores provided by the pre-filtering procedure include components corresponding to a crude acoustic comparison and a language model score indicative of the likelihood that a word is used, independently of context. The recognizer may eliminate any hypothesis that is associated with a constraint grammar (e.g., a command hypothesis), but does not comply with the constraint grammar.

Figure 12:
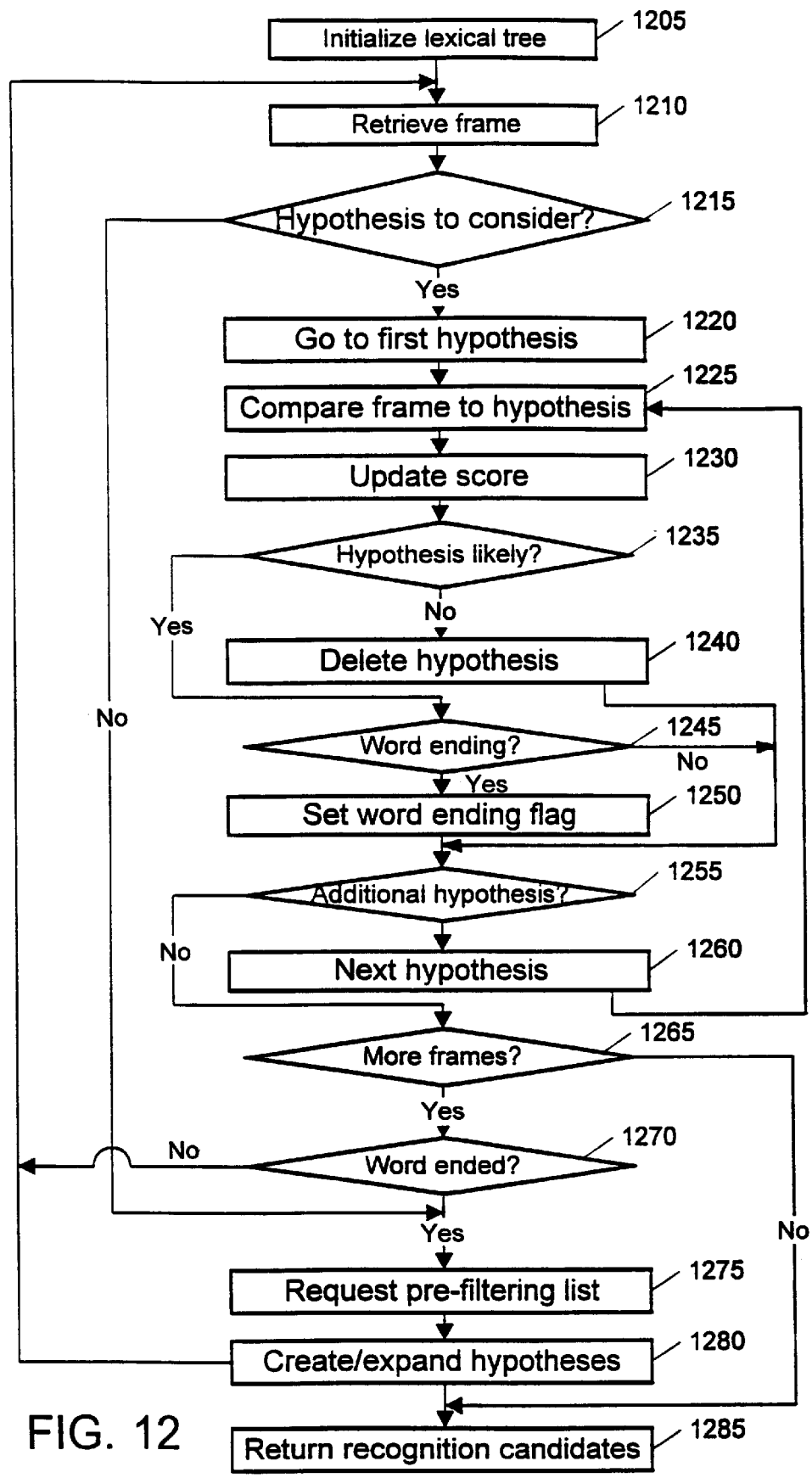
FIG. 12 is a flow chart of a speech recognition procedure.

Referring to FIG. 12, the recognizer 215 operates according to a procedure 1200. First, prior to processing, the recognizer 215 initializes the lexical tree 500 as described above (step 1205). The recognizer 215 then retrieves a frame of parameters (step 1210) and determines whether there are hypotheses to be considered for the frame (step 1215). The first frame always corresponds to silence so that there are no hypotheses to be considered for the first frame.

If hypotheses need to be considered for the frame (step 1215), the recognizer 215 goes to the first hypothesis (step 1220). The recognizer then compares the frame to acoustic models 235 for the last word of the hypothesis (step 1225) and, based on the comparison, updates a score associated with the hypothesis (step 1230).

After updating the score (step 1230), the recognizer determines whether the user was likely to have spoken the word or words corresponding to the hypothesis (step 1235). The recognizer makes this determination by comparing the current score for the hypothesis to a threshold value. If the score exceeds the threshold value, then the recognizer 215 determines that the hypothesis is too unlikely to merit further consideration and deletes the hypothesis (step 1240).

If the recognizer determines that the word or words corresponding to the hypothesis were likely to have been spoken by the user, then the recognizer determines whether the last word of the hypothesis is ending (step 1245). The recognizer determines that a word is ending when the frame corresponds to the last component of the model for the word. If the recognizer determines that a word is ending (step 1245), the recognizer sets a flag that indicates that the next frame may correspond to the beginning of a word (step 1250).

If there are additional hypotheses to be considered for the frame (step 1255), then the recognizer selects the next hypothesis (step 1260) and repeats the comparison (step 1225) and other steps. If there are no more hypotheses to be considered for the frame (step 1255), then the recognizer determines whether there are more frames to be considered for the utterance (step 1265). The recognizer determines that there are more frames to be considered when two conditions are met. First, more frames must be available. Second, the best scoring node for the current frame or for one or more of a predetermined number of immediately preceding frames must have been a node other than the silence node (i.e., the utterance has ended when the silence node is the best scoring node for the current frame and for a predetermined number of consecutive preceding frames).

If there are more frames to be considered (step 1265) and the flag indicating that a word has ended is set (step 1270), or if there were no hypotheses to be considered for the frame (step 1215), then the recognizer requests from the pre-filtering procedure 240 a list of words that may start with the next frame (step 1275).

Upon receiving the list of words from the pre-filtering procedure, the recognizer uses the list of words to create hypotheses or to expand any hypothesis for which a word has ended (step 1280). Each word in the list of words has an associated score. Prior to adding a list word to a hypothesis, the recognizer modifies the list score ($S_L$) for the word to produce a modified list score ($S_{ML}$) as:

$$S_{ML} = S_L + L_C - L_L,$$

where $L_C$ is a language model score that represents the frequency with which the pair of words that includes the list word and the immediately preceding word in the hypothesis are used together in speech, and $L_L$ is a language model score included in the list score and corresponds to the frequency with which the list word is used in speech, without reference to context. The recognizer then adds the modified list score to the score for the hypothesis and compares the result to a threshold value. If the result is less than the threshold value, then the recognizer maintains the hypothesis. Otherwise, the recognizer determines that the hypothesis does not merit further consideration and abandons the hypothesis. As an additional part of creating or expanding the hypotheses, the recognizer compares the hypotheses to the active constraint grammars 225 and abandons any hypothesis that corresponds to no active constraint grammar. The recognizer then retrieves the next frame (step 1210) and repeats the procedure.

If there are no more speech frames to process, then the recognizer 215 provides the most likely hypotheses to the control/interface module 220 as recognition candidates (step 1285).

The control/interface module 220 controls operation of the speech recognition software and provides an interface to other software or to the user. The control/interface module receives the list of recognition candidates for each utterance from the recognizer. Recognition candidates may correspond to dictated text, speech recognition commands, or external commands. When the best-scoring recognition candidate corresponds to dictated text, the control/interface module provides the text to an active application, such as a word processor. The control/interface module also may display the best-scoring recognition candidate to the user through a graphical user interface. The control/interface module controls operation of the speech recognition software in response to speech recognition commands (e.g., "wake up", "make that"), and forwards external commands to the appropriate software.

The control/interface module also controls the active vocabulary, acoustic models, and constraint grammars that are used by the recognizer. For example, when the speech recognition software is being used in conjunction with a particular application (e.g., Microsoft Word), the control/interface module updates the active vocabulary to include command words associated with that application and activates constraint grammars associated with the application.

Other functions provided by the control/interface module 220 include a vocabulary customizer and a vocabulary manager. The vocabulary customizer optimizes the language model of a specific topic by scanning user supplied text. The vocabulary manager is a developer tool which is used to browse and manipulate vocabularies, grammars and macros. Each such function of the control/interface module 220 may be implemented as an executable program that is separate from the main speech recognition software. Similarly, the control/interface module 220 also may be implemented as a separate executable program.

The control/interface module 220 also may provide an enrollment program that uses an enrollment text and a corresponding enrollment grammar to customize the speech recognition software to a specific user. The enrollment program may operate in an interactive mode that guides the user through the enrollment process, or in a non-interactive mode that permits the user to enroll independently of the computer. In the interactive mode, the enrollment program displays the enrollment text to the user and the user reads the displayed text. As the user reads, the recognizer 215 uses the enrollment grammar to match a sequence of utterances by the user to sequential portions of the enrollment text. When the recognizer 215 is unsuccessful, the enrollment program prompts the user to repeat certain passages of the text. The recognizer uses acoustic information from the user's utterances to train or adapt acoustic models 235 corresponding to the matched portions of the enrollment text. An interactive enrollment program is discussed in U.S. application Ser. No. 08/825,536, entitled "ENROLLMENT IN SPEECH RECOGNITION" and filed Mar. 28, 1997, which is incorporated by reference.

In the non-interactive mode, the user reads the text without prompting from the computer. This offers the considerable advantage that, in addition to reading text displayed by the computer, the user can read from a printed text independently of the computer. Thus, the user could read the enrollment text into a portable recording device and later download the recorded information into the computer for processing by the recognizer, or could read the enrollment text over a telephone line. In addition, the user is not required to read every word of the enrollment text, and may skip words or paragraphs as desired. The user also may repeat portions of the text. This adds substantial flexibility to the enrollment process.

The enrollment program may provide a list of enrollment texts, each of which has a corresponding enrollment grammar, for the user's selection. Alternatively, the user may input an enrollment text from another source. In this case, the enrollment program may generate the enrollment grammar from the input enrollment text, or may employ a previously generated enrollment grammar.

Figure 13:
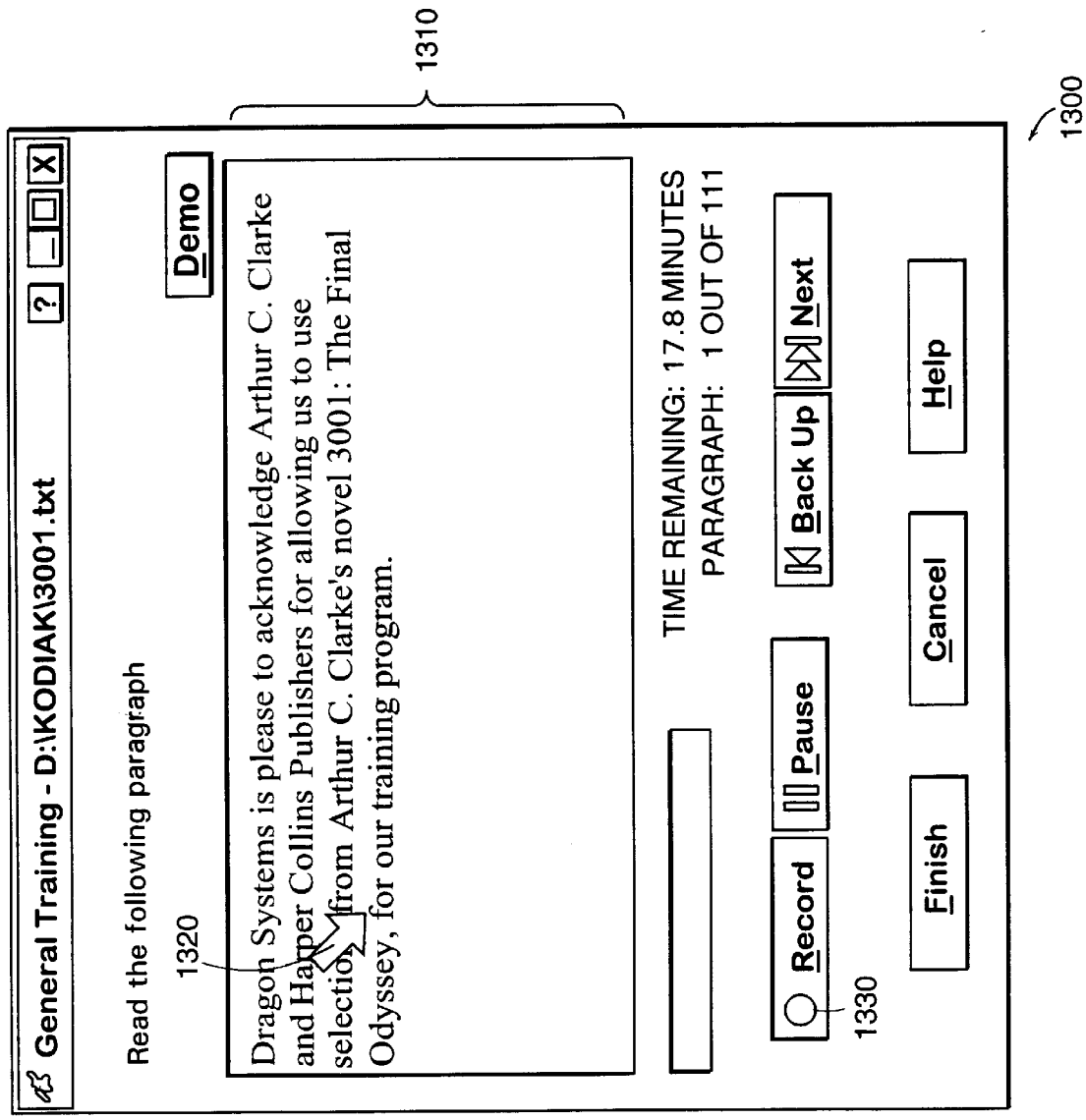
FIGS. 13 and 14 show a user interface for an enrollment program.
Figure 14:
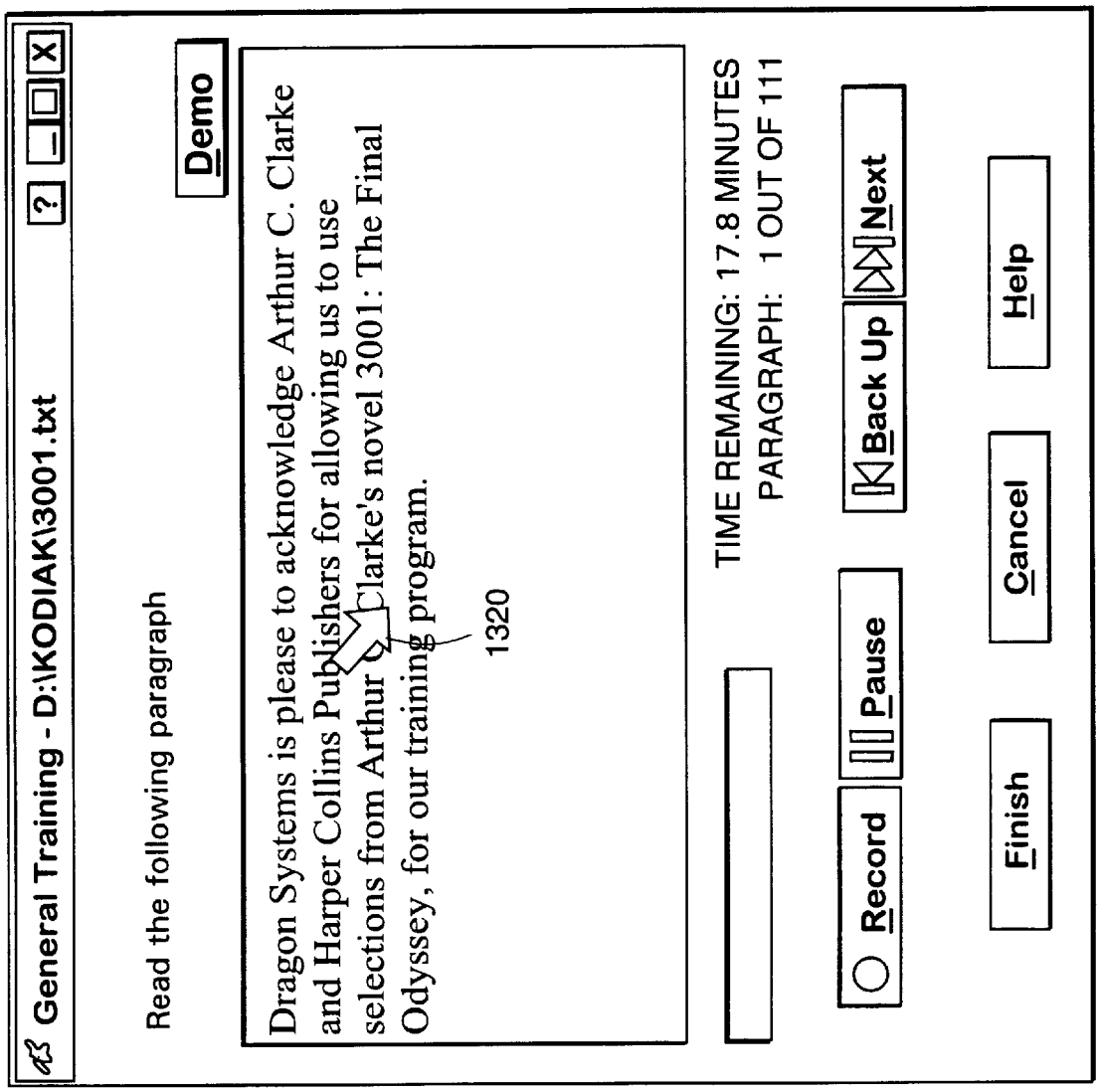

FIG. 13 shows a user interface 1300 of the interactive enrollment program. The user interface 1300 displays an enrollment text 1310 for the user to read and displays the user's current position, also referred to as the "enrollment position", using, for example, a moving arrow 1320 in the enrollment text. The display of FIG. 13 shows an enrollment position at the word "for", indicating that the enrollment program has recognized the user's reading of the enrollment text up to the word "for" and that the enrollment process will continue when the user continues reading, beginning with the word "for". By contrast, the display of FIG. 14 indicates an enrollment position at the word "program". In addition to using the arrow, the user interface may display the enrollment position by highlighting portions of the text as they are recognized or displaying a cursor at the enrollment position.

Using the user interface 1300 of FIG. 13, the user starts the enrollment program by selecting the Record button 1330 through a voiced command or an input device such as a mouse. The user then reads the displayed text 1310 beginning with the text at the enrollment position, as indicated by the arrow 1320. As the user reads, the recognizer 215 matches the user's speech to the enrollment text using the enrollment grammar and advances the enrollment position (and arrow 1320) to the beginning of the next word to be spoken. Acoustic models corresponding to the enrollment text are updated based on the matching user utterances. In general, the recognizer 215 does not use the pre-filtering procedure 240 during the enrollment process.

Figure 15:
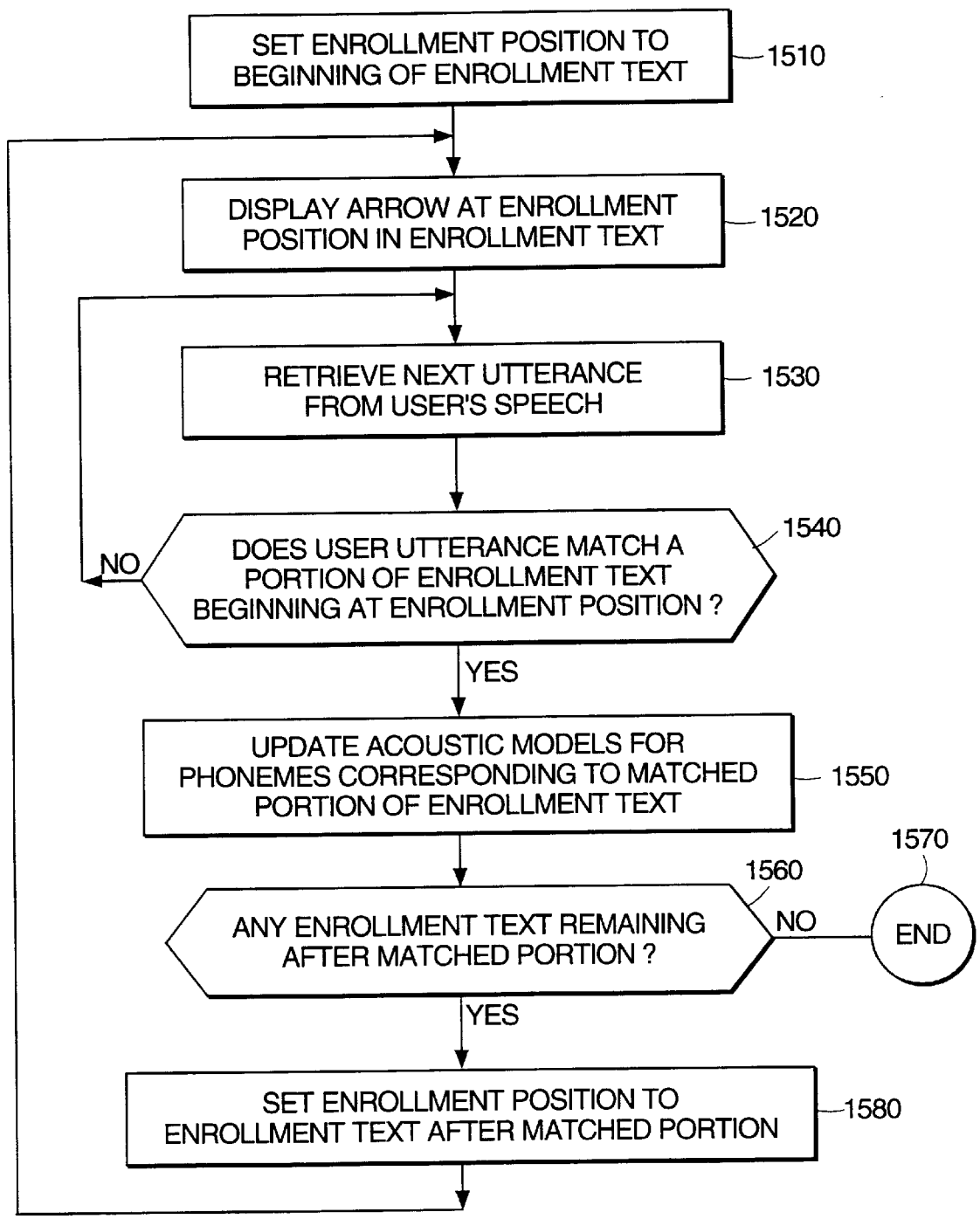
FIGS. 15–17 are flow charts of enrollment procedures.

As shown in FIG. 15, the enrollment program begins by setting the enrollment position at the beginning of the enrollment text (step 1510) and displaying the arrow at the enrollment position (step 1520). The enrollment program next receives the user's digitized speech for an utterance (step 1530). The recognizer 215, using the enrollment grammar corresponding to the enrollment text, determines whether the utterance matches a portion of the enrollment text beginning at the enrollment position (step 1540). Because the portion of the text to which an utterance corresponds is unspecified, the recognizer 215 uses the enrollment grammar to identify a portion of the enrollment text beginning at the enrollment position that best matches the utterance.

If there is no match, the enrollment program repeats the process of retrieving and comparing the user's speech with the enrollment text (steps 1530, 1540). If there is a match, the enrollment program updates the acoustic models 235 corresponding to the matched portion of the enrollment text based on the user utterance (step 1550). Alternatively, the enrollment program may update the acoustic models after specific segments (such as sentences or paragraphs) of enrollment text have been recognized, or after the entire enrollment text has been recognized.

If no enrollment text remains after the matched portion of enrollment text (step 1560), the enrollment program for that enrollment text ends (step 1570). If the enrollment program provides multiple enrollment texts, after finishing one enrollment text, the enrollment program may automatically begin the next enrollment text by displaying the new enrollment text and setting the enrollment position at the beginning of that new text (step 1510).

If enrollment text remains at step 1560, the enrollment position is advanced to the word following the matched portion of the enrollment text (step 1580), the arrow display is updated to point to the updated enrollment position (step 1520), and the enrollment process continues.

Different methods may be used to determine whether a user utterance matches a portion of the enrollment text (step 1540). For example, the enrollment grammar may be implemented to recognize that different users may pause at different positions in the enrollment text, with the result that utterances of different users may not uniformly correspond to the same portion of the enrollment text. As noted above, the enrollment grammar may handle such situations by allowing different lengths of enrollment text to match a user's utterance.

The enrollment grammar may be implemented to recognize and appropriately handle expected variations in the user's reading of the enrollment text in determining whether a user utterance matches a portion of the enrollment text. An example of such a variation is the dictation convention of enunciating punctuation marks: at the end of sentence, the user may enunciate the word "period". To handle this situation, the enrollment grammar may be implemented to recognize the word "period" at the end of sentences as optional. Thus, if the user says "period", the enrollment grammar matches the user's speech to the word period for purposes of updating the acoustic models. If the user does not say period, the enrollment grammar skips the optional word "period" and proceeds to the next word in the enrollment text.

Similar rules may be implemented for handling user enunciation of spacing (e.g., new line or new paragraph), and formatting conventions (e.g., capitalization, bold, underline, or italics). For example, the enrollment grammar for the passage of text illustrated in FIG. 13 may be expressed in EBNF as:

<recognition result>::=[Capitalize] dragon [Capitalize] systems is pleased to acknowledge [Capitalize] arthur [Capitalize] c [Period] [Capitalize] clarke and [Capitalize] harper [Capitalize] collins [Capitalize] publishers for allowing us to use selections from [Capitalize] arthur [Capitalize] c [Period] [Capitalize] {clarke's |clarke Apostrophe s} novel three thousand [and] one [Colon] [Capitalize] the [Capitalize] final [Capitalize] odyssey [Comma] for our training program [Period]

The enrollment grammar is modified as the user advances through the text. For example, when the user is at the word "for" in the text, as indicated by the arrow 1320 in FIG. 13, the enrollment grammar may be expressed in EBNF as:

<recognition result>::=for our training program [Period]

Alternatively, the enrollment grammar may be expressed as a set of rules. Appendix A includes a possible rule-based grammar for the enrollment text shown in FIG. 13. An advantage of the ruled-based grammar is that it does not need to be modified as the user advances through the text.

In general, use of the enrollment program reduces the recognition error rate of the speech recognition system by customizing acoustic models to a user's speech based on the user's pronunciation of sounds corresponding to those acoustic models in reciting the enrollment text. However, if the user says something other than the expected enrollment text, the user's speech should not be used to update the acoustic models corresponding to the expected enrollment text. This situation may arise, for example, if the user skips a line in the displayed text 1310, mistakenly reads a displayed word as a different word, or is interrupted while reading the displayed text and engages in an outside conversation. This situation also may arise if the speech recognition system picks up sounds other than the user's speech, such as a cough or sneeze, or environmental noise such as traffic or a barking dog.

The enrollment grammar permits the recognizer 215 to find the portion of the enrollment text that best corresponds to the user's utterance. However, the enrollment grammar does not permit the recognizer 215 to verify that the utterance actually corresponds to the enrollment text. For this purpose, the enrollment program uses a rejection grammar in conjunction with the enrollment grammar to identify situations in which the sound detected by the recognizer does not match the expected enrollment text.

Figure 16:
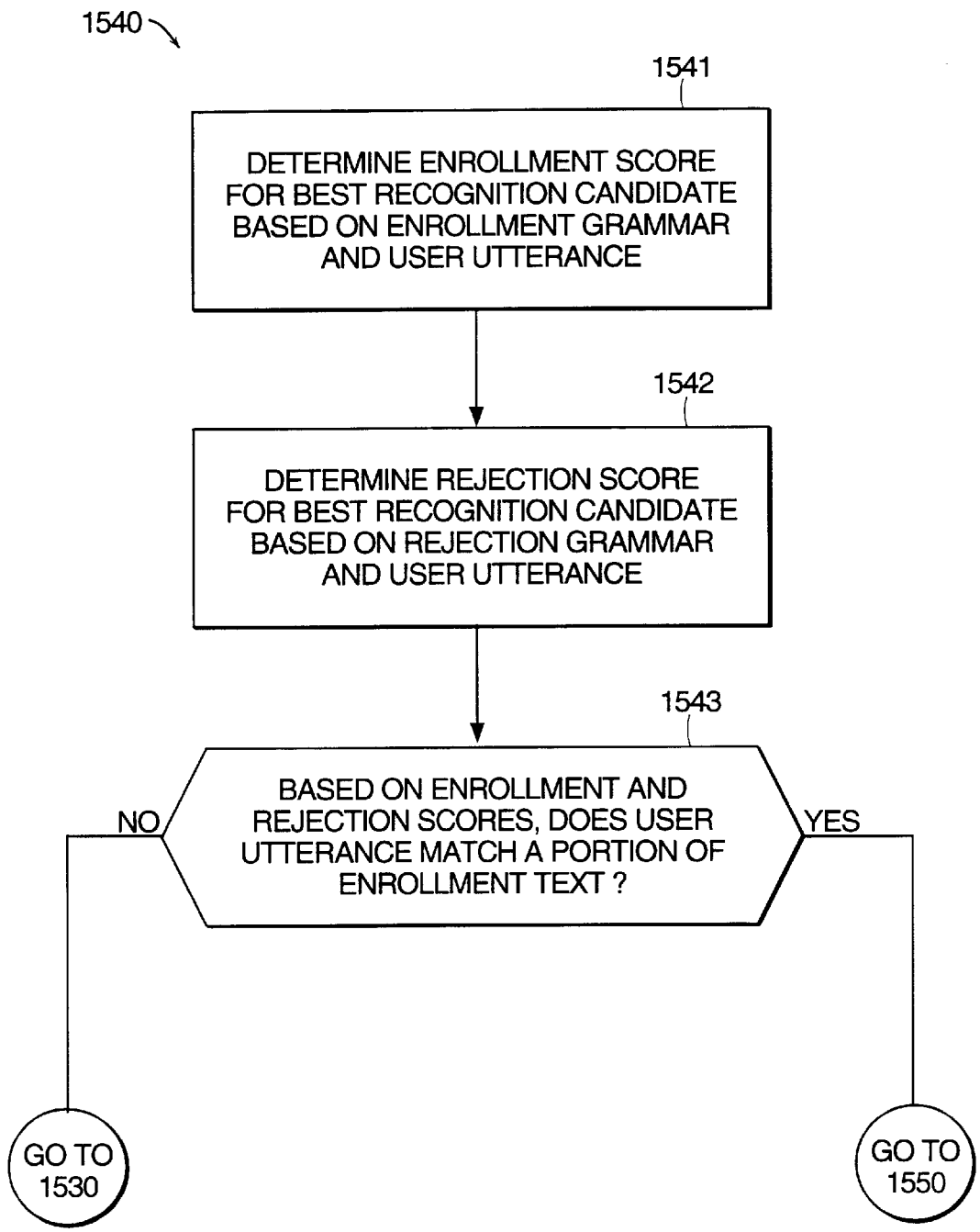

FIG. 16 elaborates the process of step 1540 of FIG. 15, where both the enrollment grammar and the rejection grammar are used to detect situations in which the user utterance should not be used to update the acoustic models for enrollment text. The enrollment program identifies a best recognition candidate that corresponds to the enrollment grammar and designates the score provided by the recognizer 215 for that candidate as the enrollment score (step 1541). The recognizer 215 may determine the score for the candidate based on criteria, such as matching acoustic models and word context.

Even the best recognition candidate may not be a good match to the enrollment text. For example, if the enrollment position is at "for", as shown in FIG. 13, and the user utterance is "from Arthur C. Clarke's novel" from the previous line, the recognizer 215 will attempt to match the utterance to the portion of the enrollment grammar starting with "for", and will produce a recognition candidate corresponding to the best match to that portion of the enrollment grammar.

The enrollment program also identifies a best recognition candidate that corresponds to the rejection grammar and designates a score provided by the recognizer 215 for that candidate as a rejection score (step 1542). In general, the rejection score should be better than the enrollment score when the user utterance does not correspond to the expected portion of the enrollment text.

The rejection grammar may be expressed in EBNF as:
    <recognition result>::=<phonemes>
where
    <phonemes>::=phoneme [<phonemes>]
and phoneme is any phoneme in a rejection grammar phoneme set. The rejection grammar phoneme set is selected such that most sounds in the expected speech can be reasonably modeled. If, as in the above example, the rejection grammar allows any combination of these phonemes, the processing required to find the best matching phonemes for an utterance can be expensive. Accordingly, the rejection grammar phoneme set may include only a subset of the set of phonemes used by the speech recognizer. For example, the attached Appendix B illustrates a set of fifty phonemes, with a subset of nineteen of the phonemes being included in the rejection grammar phoneme set.

The rejection grammar matches the acoustics of the user utterance to a sequence of phonemes from the rejection grammar phoneme set. The score associated with a rejection grammar recognition candidate reflects the degree to which the user utterance corresponds to the matched sequence of phonemes and is determined so that the rejection score is likely to be better than the enrollment score when the user utterance does not match a portion of the enrollment text.

Again referring to the above example of FIG. 13, in which the enrollment position is at "for" and the user utterance is "from Arthur C. Clarke's novel", the enrollment grammar will likely result in a recognition candidate with a score reflecting a poor match. On the other hand, the rejection grammar will result in a recognition candidate that may not be "from Arthur C. Clarke's novel" exactly, but will likely be closer than the enrollment recognition candidate beginning with "for". Accordingly, the rejection grammar should result in a recognition candidate having a better match and a better score.

The enrollment program determines whether the user utterance matches an enrollment utterance by comparing the enrollment score to the rejection score (step 1543). The precise method of comparison may vary. For example, in a simple approach, the enrollment program compares the enrollment and rejection scores and, if the enrollment score is better than the rejection score, determines that the user utterance matches a portion of the enrollment text (step 1544). Alternatively, if the rejection score is better than the enrollment score, as in the above example, the enrollment program determines that the user utterance does not match a portion of the enrollment text (step 1545).

The rejection grammar has been described with reference to its use with the enrollment grammar. However, it also may be used in other circumstances, and, in general, is used whenever the large vocabulary dictation constraint grammar is not active. For example, the speech recognition software may include a "Go To Sleep" command that deactivates all constraint grammars except the rejection grammar and a grammar for recognizing a "Wake Up" command. In general, after the "Go To Sleep" command has been implemented, the recognizer 215 will recognize only the "Wake Up" command. The rejection grammar enables the control/interface module 220 to distinguish between the "Wake Up" command and noise or other sounds.

Figure 17:
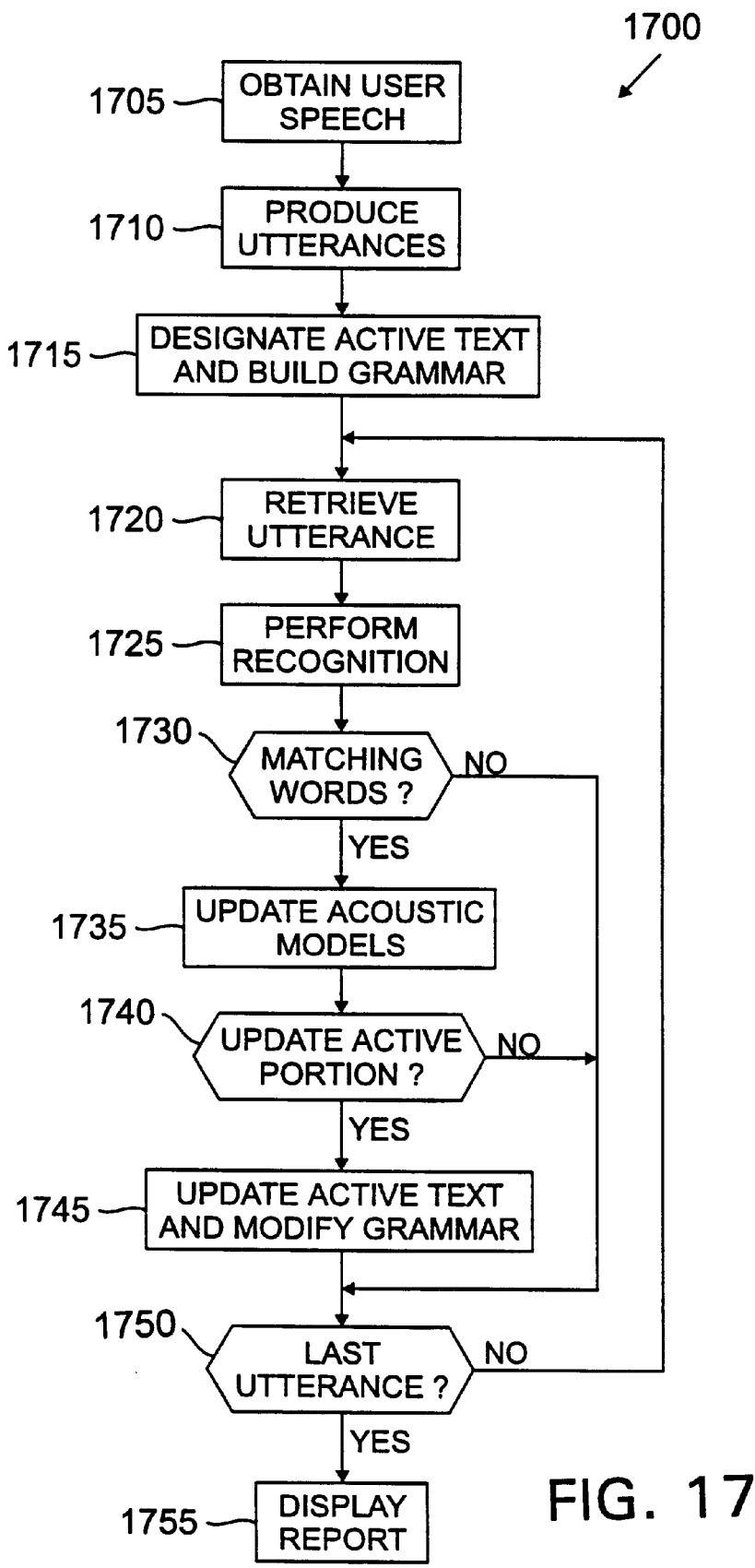

Referring to FIG. 17, the non-interactive enrollment program operates according to a procedure 1700. Initially, the program obtains user speech corresponding to an enrollment text (step 1705). This speech corresponds to the user's entire recitation of the enrollment text and may be obtained in a number of ways. For example, the user may record the speech by reading from a printed text using an analog recording device. The user then may provide the recorded speech to the computer 125 using the port 165. The printed text may be provided by the enrollment program.

The user also may record the speech using a digital recording device. In this case, the user may provide a digital file corresponding to the recorded speech using the port 170.

The user also may provide the speech using the microphone 105 and reading from a printed text or text displayed on the display 120. In contrast to the interactive enrollment program, the non-interactive enrollment program does not prompt the user as to the user's position in the text. Rather, the non-interactive enrollment program uses a text editor or comparable program to display the entire enrollment text and permits the user to navigate through the enrollment text as desired. Alternatively, the enrollment program could provide a printed version of the enrollment text for the user to read.

After the user speaks the enrollment text, the program processes the speech to produce sets of frames corresponding to user utterances (step 1710). When the speech is provided using the port 165 or the microphone 105, the program processes the speech using the sound card 140 and the procedure 300 as discussed above. When the speech is provided using the port 170, processing typically involves reformatting the contents of the digital file, and may include each step of the procedure 300. In either case, the program may determine that the speech has ended when the program encounters silence of sufficient duration (e.g., thirty seconds).

Next, the enrollment program designates an active portion of the enrollment text and builds an enrollment constraint grammar for the active portion (step 1715). For example, the active portion of the enrollment text may initially be the first three to five paragraphs of the enrollment text. In this case, the enrollment program builds an enrollment grammar that includes constraint grammars for each of the designated number of paragraphs. In general, the constraint grammars are flexible and only require that the user has said a sequence of words from the enrollment text in order. For example, an utterance may begin with any word in the enrollment grammar, and may end with any word in the enrollment grammar, so long as any intermediate words of the utterance are found, in order, in the enrollment grammar between the starting and ending words. Thus, the enrollment grammar permits recognition to occur even when the user has skipped or repeated words, sentences, or even entire paragraphs.

The enrollment grammar for the first five paragraphs of an enrollment text may be expressed in EBNF as:

<recognition result>::=<paragraph 1>|<paragraph 2>|<paragraph 3>|<paragraph 4>|<paragraph 5>, where <paragraph n>::=[word$^{1n}$[word$^{2n}$[word$^{3n}$ ... word$^{mn}$]]]| [word$^{2n}$[word$^{3n}$ ... word$^{mn}$]]| ... [word$^{mn}$], and "word$^{in}$" is word i from paragraph n.

As discussed above, the enrollment grammar may be implemented to recognize and appropriately handle expected variations in the user's reading of the enrollment text in determining whether a user utterance matches a portion of the enrollment text. Thus, as with the interactive enrollment grammar, the enrollment grammar accounts, for example, for punctuation marks, spacing, and formatting.

Next, the enrollment program retrieves an utterance (step 1720) and causes the recognizer to perform recognition on the utterance using the active enrollment grammar (step 1725). This recognition includes use of a rejection grammar and proceeds as discussed above with respect to the interactive enrollment program.

If the recognizer finds words in the utterance that match the enrollment text (step 1730), the enrollment program updates the acoustic models for the phonemes of those words (step 1735). Alternatively, the enrollment program may defer updating the acoustic models until all of the utterances have been analyzed.

After updating the acoustic models, the enrollment program determines whether the active portion of the enrollment text needs to be updated (step 1740). Generally, the enrollment program updates the active portion to maintain a window of active paragraphs around the current position of the user's speech in the enrollment text. Thus, for example, if the recognizer has just identified text that appears in the fourth paragraph of the enrollment text, and the enrollment program maintains a five paragraph active portion currently including the first through fifth paragraphs, the enrollment program may update the active portion to include paragraphs two through six.

If the active portion of the enrollment text needs to be updated, the enrollment program updates the active portion and the active enrollment grammar (step 1745). Thus, in the example noted above, the enrollment program would eliminate the portion of the constraint grammar corresponding to the first paragraph of the enrollment text and would add a portion corresponding to the sixth paragraph. The modified enrollment grammar may be expressed in EBNF as:

<recognition result>::=<paragraph 2>|<paragraph 3>|<paragraph 4>|<paragraph 5>|<paragraph 6>.

If the processed utterance is not the last utterance (step 1750), the enrollment program retrieves the next utterance (step 1720) and repeats the process.

Upon processing the last utterance, the enrollment program displays a report of the enrollment performance (step 1755). The report may include an indication of the percentage of words in the user's speech that were recognized. The report also may include an indication of the expected recognition performance using the modified acoustic models. The user may use the information from this report to determine whether it would be productive to repeat the enrollment process or to enroll using a different text.

The enrollment program creates a speaker-adapted model for the user by adapting speaker-independent acoustic models corresponding to the enrollment text based on the user's utterances. As described above, the speaker-independent acoustic models represent each triphone node as a mixture of Gaussian probability density functions ("PDFs") $N_k$ having mean vectors $\mu_k$ and covariance matrices $c_k$, with the contribution made to the triphone node by each PDF being represented by a mixture weight $w_k$. The speaker-adapted model uses the mixture weights $w_k$ and the covariance matrices $c_k$ of the speaker-independent model, but uses adapted mean vectors $\mu_{kA}$.

Figure 18:
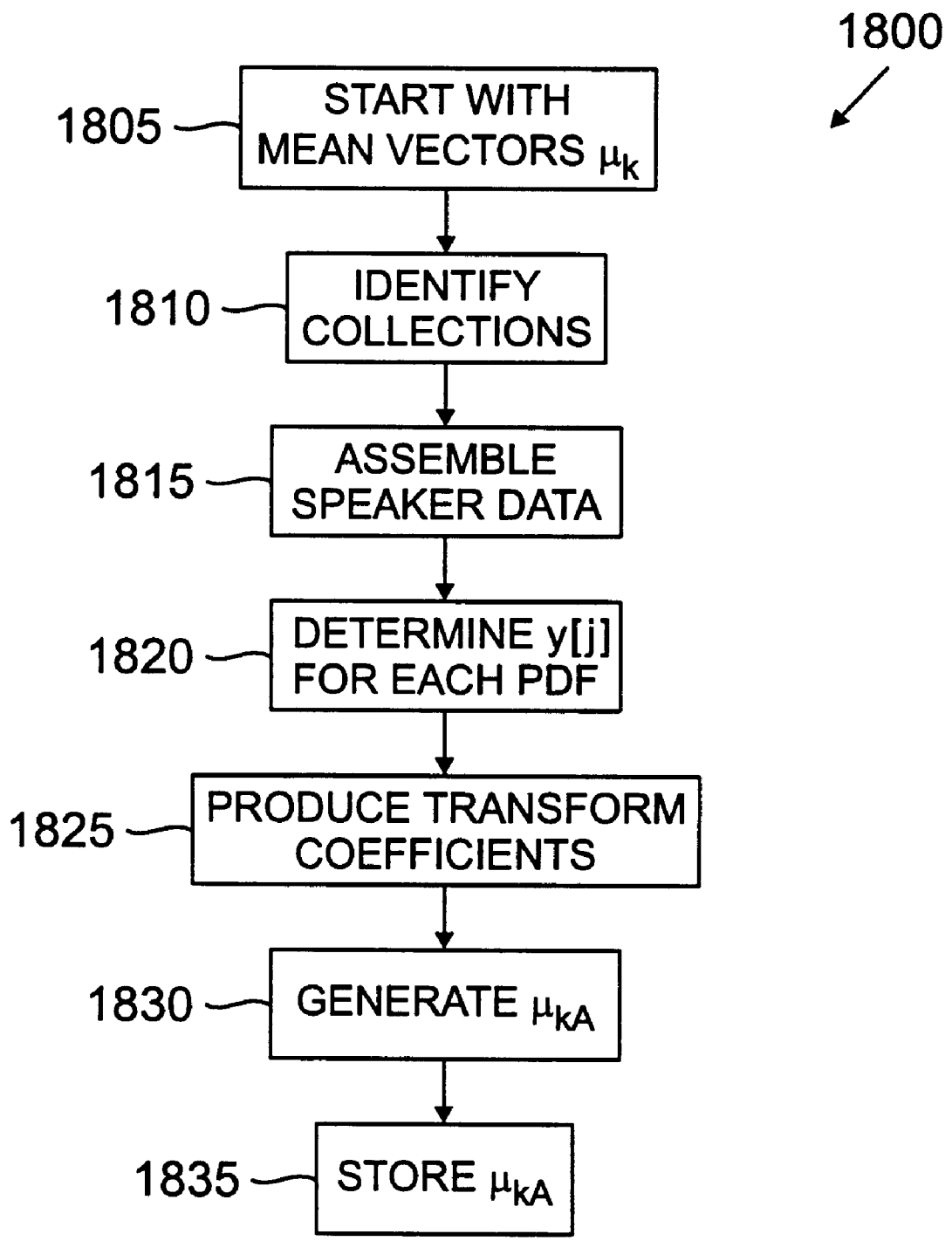
FIG. 18 is a flow chart of a model-adaptation procedure.

Referring to FIG. 18, the enrollment program generates the adapted mean vectors $\mu_{kA}$ according to a procedure 1800. Starting with the mean vectors $\mu_k$ of the speaker-independent model (step 1705), the enrollment program uses a transformation-based approach to produce the adapted mean vectors $\mu_{kA}$. The transformation-based approach assumes that an adapted mean vector $\mu_{kA}$ may be expressed as:

$$\mu_{kA} = A\mu_k + b,$$

where A and b are transforms. When each mean vector has 24 entries, A is a 24×24 matrix and b has 24 entries.

Next, the enrollment program generates collections of PDFs that are expected to share a common transformation (step 1710). A collection C could include the PDFs representing similarly-sounding triphones, such as all PDFs associated with vowels or all PDFs associated with consonants. Another approach to generating collections is to group PDFs having mean vectors $\mu_k$ with similar values. This approach permits simplified generation of large numbers of collections. In general, implementations may include from one to several hundred different collections. Initial experimental results indicate that the first approach provides better results (i.e, results with lower recognition error rates). In general, the collections may be identified prior to the enrollment session.

Next, for each collection, the enrollment program assembles all speaker data for the PDFs included in the collection (step 1715). This speaker data corresponds to the user utterances produced during the enrollment session.

Next, the enrollment program determines y[j], the average value of the speaker data vector, for each PDF j (step 1720). If f[n] is the vector for the n-th frame of speaker data, $p_j(n)$ is the probability that the n-th frame of speaker data corresponds to a PDF j (i.e., the mixture weight $w_j$ for the triphone node associated with the n-th frame of speaker data), and N is the total number of frames of speaker data, then y[j] and the frame count, N[j], for the frame j may be determined as:

$$y[j] = \left(\sum_{n=1}^{N} p_j(n)\right)^{-1} \sum_{n=1}^{N} p_j(n)f[n],$$

$$N[j] = \sum_{n=1}^{N} p_j(n).$$

This is usually referred to as the Baum-Welch or EM algorithm.

Next, the enrollment program produces transforms ($A_C$ and $b_C$) for each collection C using the relationship between the average values of the speaker data and the PDFs from the speaker-independent model (step 1725). This relationship may be expressed generally as:

$$y[j] = A_C x[j] + b_C + e,$$

where x[j] corresponds to the mean vector $\mu_j$ for a PDF j and e is an error term. Based on this relationship, $A_C^T$, the transpose of the transform $A_C$, may be determined as:

$$A_C^T = \left(\sum_{j=1}^{N_C} N(j)x[j]x^T[j]\right)^{-1} \sum_{j=1}^{N_C} N(j)x[j]y^T[j],$$

where $x^T[j]$ is the transpose of x[j], $y^T[j]$ is the transpose of y[j], and $N_C$ is the number of components in the collection C.

The transform $A_C$ is then produced by transposing $A_C^T$, and the transform $b_C$ is determined as:

$$b_c = \left(\sum_{j=1}^{N_C} N(j)\right)^{-1} \sum_{j=1}^{N_C} N(j)(y[j] - A_C x[j]).$$

Using the transforms, the enrollment program determines adapted mean vectors, $\mu_{jA}$, for each component in the collection C (step 1730). In particular, the adapted mean vectors are determined as:

$$\mu_{jA} = A_C \mu_j + b_C.$$

The enrollment program then stores the adapted mean vectors $\mu_{jA}$ along with a speaker-identifier as a speaker-adapted model for later use in recognizing speech by the user (step 1735). This process may be iterated several times by using the adapted models to update the frame counts, speaker (N[j] and y[j]), and the transform matrix.

In another implementation, fractions of the speaker independent means (x[j]) and the speaker-specific means may be used to compute y[j] and N[j]:

$$y[j] = \left(r + \sum_{n=1}^{N} p_j(n)\right)^{-1} \left(\sum_{n=1}^{N} p_j(n)f[n] + rx[j]\right)$$

$$N[j] = r + \sum_{n=1}^{N} p_j(n)$$

where r controls the relative importance of the speaker-independent means and the observed data. The value of r is optimized as a function of the amount of the adaptation data available. Techniques for adapting acoustic models are described in more detail in U.S. application Ser. No. 08/958,957, entitled "RAPID ADAPTATION OF SPEECH MODELS" and filed Oct. 28, 1997, which is incorporated by reference.

Other embodiments are within the scope of the following claims. For example, the specific methods by which the enrollment and rejection grammars score a user utterance may vary. Similarly, the method by which the scores are evaluated to determine whether the user utterance matches a portion of the enrollment text may vary.

The techniques described here are not limited to any particular hardware or software configuration; they may find applicability in any computing or processing environment that may be used for speech recognition. The techniques may be implemented in hardware or software, or a combination of the two. Preferably, the techniques are implemented in computer programs executing on programmable computers that each include a processor, a storage medium readable by the processor (including volatile and nonvolatile memory and/or storage elements), at least one input device, and one or more output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A computer-implemented method for enrolling a user in a speech recognition system, comprising:

obtaining data representing a user's speech, the speech including multiple user utterances and generally corresponding to an enrollment text;

analyzing acoustic content of data corresponding to a user utterance;

determining, based on the analysis, whether the user utterance matches a portion of the enrollment text; and if the user utterance matches a portion of the enrollment text, using the acoustic content of the user utterance to update acoustic models corresponding to the portion of the enrollment text, wherein determining whether the user utterance matches a portion of the enrollment text comprises a determination that the user utterance matches when the user has skipped at least one word of the portion of the enrollment text.

2. The method of claim 1, wherein obtaining data comprises obtaining data recorded using a recording device physically separate from the computer implementing the method.

3. The method of claim 2, wherein the recording device comprises a digital recording device, and obtaining data comprises receiving a file from the digital recording device.

4. The method of claim 2, further comprising
displaying the enrollment text on a computer display for a user to read aloud, and
recording the user's reading of the enrollment text on the recording device.

5. The method of claim 2, further comprising
providing the enrollment text on a printed page for a user to read aloud, and
recording the user's reading of the enrollment text on the recording device.

6. The method of claim 2, wherein obtaining data comprises receiving signals generated by playing back the user's speech using the recording device.

7. The method of claim 6, wherein the recording device comprises an analog recording device.

8. The method of claim 1, further comprising designating an active portion of the enrollment text, wherein analyzing acoustic content of data corresponding to a user utterance comprises analyzing the data relative to the active portion of the enrollment text.

9. The method of claim 8, wherein analyzing the data relative to the active portion of the enrollment text comprises attempting to match the data to models for words included in the active portion of the enrollment text.

10. The method of claim 8, wherein analyzing the data relative to the active portion of the enrollment text comprises using an enrollment grammar corresponding to the active portion of the enrollment text.

11. The method of claim 8, further comprising identifying a position of a previously analyzed utterance in the enrollment text, wherein designating an active portion of the enrollment text comprises designating an active portion based on the identified position.

12. The method of claim 11, wherein designating the active portion comprises designating a portion that includes text preceding and following the identified position.

13. The method of claim 12, wherein designating the active portion comprises designating a portion that includes a paragraph including the identified position, a paragraph preceding the identified position, and a paragraph following the identified position.

14. The method of claim 1, wherein determining whether the user utterance matches a portion of the enrollment text comprises using an enrollment grammar corresponding to the enrollment text.

15. The method of claim 14, wherein determining whether the user utterance matches a portion of the enrollment text further comprises using a rejection grammar.

16. The method of claim 15, wherein the rejection grammar comprises a phoneme grammar.

17. The method of claim 16, wherein the rejection grammar models an utterance using a set of phonemes that is smaller than a set of phonemes used by the enrollment grammar.

18. The method of claim 1, further comprising ignoring the user utterance upon determining that the user utterance does not match a portion of the enrollment text.

19. The method of claim 1, wherein the at least one word of the enrollment text comprises more than one word of the enrollment text.

20. The method of claim 1, wherein the determining that the user utterance matches comprises a determination that the user utterance matches despite one or more words in the user utterance not found in the portion of the enrollment text.

21. Computer software, residing on a computer-readable storage medium, comprising instructions for causing a computer to:
obtain data representing a user's speech, the speech including multiple user utterances and generally corresponding to an enrollment text;
analyze acoustic content of data corresponding to a user utterance;
determine, based on the analysis, whether the user utterance matches a portion of the enrollment text; and use the acoustic content of the user utterance to update acoustic models corresponding to a portion of the enrollment text that matches the user utterance;
wherein the instructions configure the computer to determine that the user utterance matches when the user has skipped at least one word of the portion of the enrollment text.

22. The method of claim 21, wherein the at least one word of the enrollment text comprises more than one word of the enrollment text.

23. The method of claim 21, wherein the determining that the user utterance matches comprises a determination that the user utterance matches despite one or more words in the user utterance not found in the portion of the enrollment text.

24. A speech recognition system for enrolling a user, comprising:
an input device for receiving speech signals; and a processor configured to: obtain data representing a user's speech, the speech including multiple user utterances and generally corresponding to an enrollment text;
analyze acoustic content of data corresponding to a user utterance;
determine, based on the analysis, whether the user utterance matches a portion of the enrollment text; use the acoustic content of the user utterance to update acoustic models corresponding to a portion of the enrollment text that matches the user utterance; and
determine that the user utterance matches when the user has skipped at least one word of the portion of the enrollment text.

25. The method of claim 24, wherein the at least one word of the enrollment text comprises more than one word of the enrollment text.

26. The method of claim 24, wherein the determining that the user utterance matches comprises a determination that the user utterance matches despite one or more words in the user utterance not found in the portion of the enrollment text.

27. A computer-implemented method for enrolling a user in a speech recognition system, comprising:
obtaining data representing a user's speech from a recording device physically separate from the computer implementing the method, the speech including multiple user utterances and generally corresponding to an enrollment text;
analyzing acoustic content of the obtained data corresponding to a user utterance to identify a sequence of words in the user utterance;
determining, using the sequence of words, whether the user utterance matches a portion of the enrollment text; and
if the user utterance matches a portion of the enrollment text, using the acoustic content of the user utterance to update acoustic models corresponding to the portion of the enrollment text,
wherein determining whether the user utterance matches a portion of the enrollment text comprises a determination that the user utterance matches when the sequence of words in the user utterance is different than a sequence of words in the portion of the enrollment text.

28. The method of claim 27, wherein the determination that the user utterance matches comprises a determination that words found both in the user utterance and in the portion of,the enrollment text occur in the same order.

29. The method of claim 27, wherein the sequence of words in the user utterance comprises at least one word not present in the portion of the enrollment text.

30. The method of claim 27, wherein the words in the portion of the enrollment text comprise at least one word not present in the sequence of words in the user utterance.

31. The method of claim 27, further comprising selecting the portion of the enrollment text from the enrollment text.

* * * * *